United States Patent
Czajkowski et al.

(10) Patent No.: US 8,584,129 B1
(45) Date of Patent: Nov. 12, 2013

(54) DISPENSER DETERMINES RESPONSES TO RESOURCE REQUESTS FOR A SINGLE RESPECTIVE ONE OF CONSUMABLE RESOURCE USING RESOURCE MANAGEMENT POLICY

(75) Inventors: Grzegorz J. Czajkowski, Mountain View, CA (US); Glenn C. Skinner, Palo Alto, CA (US); Ciaran J. Bryce, Geneva (CH); Stephen C. Hahn, Redwood City, CA (US); Peter James Soper, Apex, NC (US)

(73) Assignee: Oracle America, Inc., Redwood City, CA (US)

(*) Notice: Subject to any disclaimer, the term of this patent is extended or adjusted under 35 U.S.C. 154(b) by 2608 days.

(21) Appl. No.: 10/783,738

(22) Filed: Feb. 20, 2004

(51) Int. Cl.
*G06F 9/46* (2006.01)
*G06F 9/44* (2006.01)

(52) U.S. Cl.
USPC .......................... 718/104; 718/100; 717/100

(58) Field of Classification Search
USPC .................. 718/104, 100, 102; 726/1, 2, 6, 7
See application file for complete search history.

(56) References Cited

U.S. PATENT DOCUMENTS

| | | | | |
|---|---|---|---|---|
| 5,826,082 A * | 10/1998 | Bishop et al. | ................ | 718/104 |
| 6,009,275 A * | 12/1999 | DeKoning et al. | ............ | 710/220 |
| 6,014,700 A * | 1/2000 | Bainbridge et al. | .......... | 709/226 |
| 6,081,826 A * | 6/2000 | Masuoka et al. | ............. | 718/100 |
| 6,473,791 B1 * | 10/2002 | Al-Ghosein et al. | ......... | 709/217 |
| 6,584,489 B1 * | 6/2003 | Jones et al. | .................... | 718/104 |
| 6,601,082 B1 * | 7/2003 | Durham et al. | ............... | 718/100 |
| 7,140,020 B2 * | 11/2006 | McCarthy et al. | ............ | 718/104 |
| 7,152,157 B2 * | 12/2006 | Murphy et al. | ............... | 713/100 |
| 2001/0054091 A1 * | 12/2001 | Lenz et al. | ..................... | 709/221 |
| 2002/0129143 A1 * | 9/2002 | McKinnon et al. | ........... | 709/225 |
| 2002/0152305 A1 * | 10/2002 | Jackson et al. | ................ | 709/224 |
| 2002/0194251 A1 * | 12/2002 | Richter et al. | ................ | 709/105 |
| 2003/0028642 A1 * | 2/2003 | Agarwal et al. | ............... | 709/226 |
| 2003/0198335 A1 * | 10/2003 | Porter et al. | ............. | 379/265.02 |
| 2003/0233580 A1 * | 12/2003 | Keeler et al. | .................... | 713/201 |
| 2005/0022157 A1 * | 1/2005 | Brendle et al. | ................ | 717/104 |
| 2005/0022185 A1 * | 1/2005 | Romero | ........................ | 718/100 |
| 2005/0071470 A1 * | 3/2005 | O'Brien et al. | ............... | 709/226 |
| 2006/0230405 A1 * | 10/2006 | Fraenkel et al. | ............. | 718/104 |
| 2006/0294238 A1 * | 12/2006 | Naik et al. | ..................... | 709/226 |

FOREIGN PATENT DOCUMENTS

WO   WO 01/84301 A2 * 11/2001

OTHER PUBLICATIONS

Liu et al., "Adaptive coordination of agents for timely and resource-bounded information monitoring", 2000, IEEE, pp. 1-8.*
Jones et al., "CPU reservations and time constraints: implementation experience on Windows NT", USENIX association, 1999, pp. 1-11.*

(Continued)

*Primary Examiner* — Meng An
*Assistant Examiner* — Caroline H Arcos
(74) *Attorney, Agent, or Firm* — Robert C. Kowert; Meyertons, Hood, Kivlin, Kowert & Goetzel, P.C.

(57) ABSTRACT

Providing an intermediate isolate, referred to as a dispenser, to handle resource requests allows for monitoring and controlling of resource consumption separate from an operating system. Resources are characterized with a set of common attributes, separate from their specific implementation. The dispenser invokes computations that provide policy decisions corresponding to a resource request. The dispenser provides the requesting isolate a response based at least in part on the policy decisions. Separating management of resources from the operating system facilitates implementation of a dispenser in a safe language and management of a broad range of resources by the dispenser.

76 Claims, 17 Drawing Sheets

(56) References Cited

OTHER PUBLICATIONS

SUN, "JSR 121: Application isolation API specification", 2001, SUN, pp. 1-6.*

Small et al., "A tool for constructing safe extensible C++ systems", USENIX, 1997, pp. 1-11.*

Courtrai et al., "Resource management for parallel adaptive components", IEEE, 2003, pp. 1-7.*

Small et al., "A tool for constructing safe extensible C++ systems", USENIX, 1997, pp. 1-11.*

Czajkowski et al., "Resource management interface for java platform", SUN, 2003, pp. 1-17.*

Liu et al., "Adaptive coordination of agents for timely and resource-bounded information monitoring", 2000, IEEE, pp. 1-8.*

I Jones et al., "CPU reservations and time constraints: implementation experience on Windows NT", USENIX association, 1999, pp. 1-11.*

Back, Godmar, et al., Processes in KaffeOS: Isolation, Resource Management, and Sharing in Java, 4th OSDI, San Diego, CA, 2000, 14 pages.

Binder, Walter, et al., Portable Resource Control in Java: The J-SEAL2 Approach, 16th ACM OOPSLA, Tampa Bay, FL, Oct. 2001, 17 pages.

Vitek, J. and Bryce, C., The JavaSeal Mobile Agent Kernel, 3rd International Symposium on Mobile Agents, Palm Springs, CA, Oct. 1999, pp. 89-113.

Czajkowski, G., et al., JRes: A Resource Accounting Interface for Java, 13th ACM OOPSLA, Vancouver, BC, Oct. 1998, 15 pages.

Czajkowski, G., et al., Multitasking without Compromise: A Virtual Machine Evolution, ACM OOPSLA, Tampa, FL, Oct. 14-18, 2001, 14 pages.

Golm, Michael, et al., The JX Operating System, The USENIX Annual Technical Conf., Monterey, CA, Jun. 2002, 14 pages.

Gong, Li, et al., Inside Java™ 2 Platform Security, Second Edition, Addison-Wesley, 2003, Chapter 3, pp. 31-39, Chapter 5, pp. 57-86, Chapter 6, pp. 87-112, Chapter 9, pp. 157-176.

Gosling, James, et al., The Java™ Language Specification, Second Edition, Addison-Wesley, 2000, Chapter 8, pp. 135-197, Chapter 9, pp. 199-208.

Hall, Marty and Brown, Larry, Core Servlets and JavaServer Pages, vol. 1: Core Technologies, Second Edition, Prentice Hall, 2000, Chapter 3, pp. 65-92.

Emmerson, Steven R., et al., Java Community Process, JSR 108: Units Specification, http://jcp.org/jsr/detail/108.jsp., Mar. 6, 2001, 4 pages.

Soper, Pete, Java Community Process, JSR 121: Application Isolation API Specification, http://jcp.org/jsr/detail/121.jsp, Apr. 17, 2011, 6 pages.

Suri, N., et al., State Capture and Resource Control for Java: The Design and Implementation of the Aroma Virtual Machine, Java Virtual Machine Research and Technology Symposium, Monterey, CA, Apr. 2001, pp. 1-13.

Sun Microsystems, Inc., The Java HotSpot™ Virtual Machine, v1.4.1, d2, A Technical White Paper, Sep. 2002, pp. 1-25.

* cited by examiner

DISPENSER DETERMINES RESPONSES TO RESOURCE REQUESTS FOR A SINGLE RESPECTIVE ONE OF CONSUMABLE RESOURCE USING RESOURCE MANAGEMENT POLICY

BACKGROUND

1. Field of the Invention

The present invention relates to the field of computers. More specifically, the present invention relates to resource management.

2. Description of the Related Art

Traditionally, resource management is handled by operating system environments. Resource management includes management of CPU time, heap memory, and network bandwidth. Since resource management is typically handled by operating system environments, application and generation of resource management policies are limited by operating system environment constraints and complicated by native/proprietary code or shell scripts necessary to interact with the operating system.

Meeting performance requirements and satisfying various tasks, such as load balancing or preventing denial of service attacks, are difficult if not impossible within the limitations of operating system controlled resource management. Safe languages, such as the Java® language, provide a vehicle for meeting performance requirements and satisfying various tasks that are difficult or impossible within the traditional operating system environment limitations.

A safe language (e.g., Java®, Tcl, TeleScript, etc.) allows untrusted program components to be incorporated in a framework where untrusted program components interact safely and efficiently with other program components. A safe language prohibits a program component from circumventing programming abstractions and access restrictions (e.g., illegal type casts, function calls with arguments of inappropriate type or causing stack overflow). An example design aspect for a safe language is removal of pointers. Many access protection problems stem from a program's ability to forge pointers. A program can use pointers and pointer arithmetic to violate access restrictions by accessing objects as something they are not (e.g., a byte array or an object with the same data layout as the actual object but without its access-restrictions). A safe language can provide separate name-spaces to prevent confusion of variables and functions between programs, and ways to insure provision of a service. Generally, safe languages use one or more of three approaches to ensure that a programs' access privileges are constrained: restrict or disallow access to the underlying system; analyze a program to ensure that it conforms to certain stipulated restrictions; or use a computational model that makes certain actions impossible to implement.

Safe languages are increasingly being used as the primary vehicle for organizing computing resources into applications, network services, etc. As part of this evolutionary trend, safe languages are being used to implement complete computing platforms, assuming responsibilities that have historically belonged to the underlying operating system environment.

However, the conventional use of safe languages to implement complete computing platforms falls short to the extent that safe languages do not provide some of the features of operating system environments. This shortfall and the lack of a standard, programmatic way to manage resources outside of the operating system environment has forced developers to take cognizance of the underlying operating system environment, thus leading to a number of awkward, ad-hoc techniques, limiting the expressiveness of safe languages.

SUMMARY OF THE INVENTION

Providing an intermediate computation(s), referred to herein as a dispenser, to handle resource requests allows for monitoring and control of resource consumption separate from an operating system environment. Separating management of resources from the operating system environment facilitates implementation of a dispenser in a safe language (i.e., a language that provides numerous features and flexibility such as portability across platforms). In addition, separating management of resources from their implementations facilitates management of a broad range of resources by the dispenser. Characterizing resources with a set of common attributes allows the dispenser to manage resources without being aware of their specific implementations.

In accordance with some embodiments of the invention, a dispenser monitors resource requests for a resource and controls resource requests for the resource. The dispenser monitors and controls the resource requests separately from the resource's implementation. In addition, the dispenser is separate from computations that consume the resource and from computations that implement the resource.

In accordance with some embodiments of the invention, a method comprises processing requests based at least in part on common attributes of a resource that are separate from the resource's implementation. The requests correspond to the resource. The method also comprises providing responses to a set of one or more computations that correspond to the requests.

In accordance with some embodiments of the invention, a method comprises governing a resource request from a resource consuming isolate. The resource request is governed based at least in part on common attributes of the requested resource that are separate from the requested resource's implementation. The method also comprises providing a response to the isolate.

In accordance with some embodiments of the invention, a computer program product, encoded on one or more machine-readable media, comprises a dispenser class that defines an interface to expose resources to computations that consume resources and to handle resource requests, and a resource request action class that defines an action to invoke an instance of the dispenser class.

In accordance with some embodiments of the invention, a computer program product, encoded on one or more machine-readable media, comprises a common resource attribute class that defines common attributes for characterizing resources separate from the resources' specific implementations. The computer program product also comprises a dispenser class that defines a posting facility to process posted resource requests based at least in part on abstractions of resources utilizing the common resource attribute class.

In accordance with some embodiments of the invention, a computer program product, encoded on one or more machine-readable media, comprises means for characterizing resources with common attributes to separate resources from their implementations. The computer program product also comprises means for separating management of resource requests from resource implementations and for hiding computations that implement resources from resource consumers.

In accordance with some embodiments of the invention, an apparatus comprises system memory, and means for abstracting implementation of a resource from monitoring and controlling resource requests for the resource posted by first computations and serviced by resource implementers. The first computations are encapsulated to prevent sharing of states.

These and other aspects of the described invention will be better described with reference to the Description of the Preferred Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

FIG. 2A depicts isolates comprising computations according to some realizations of the invention. FIG. 2B depicts applications as isolates according to some realizations of the invention. FIG. 2C depicts processes as isolates according to some realizations of the invention.

FIG. 5A depicts a flowchart for a dispenser to execute triggers and policy decision actions according to some realizations of the invention. FIG. 5B depicts a flowchart, which continues from FIG. 5B, for verifying a merged decision against a standing reservation according to some realizations of the invention.

FIG. 9A depicts a flowchart for a dispenser to collect actions for a resource request that indicates a resource domain according to some realizations of the invention. FIG. 9B continues from FIG. 9A and depicts a flowchart for handling received policy decisions according to some realizations of the invention.

The use of the same reference symbols in different drawings indicates similar or identical items.

DETAILED DESCRIPTION OF PREFERRED REALIZATION(S)

Figure 1:
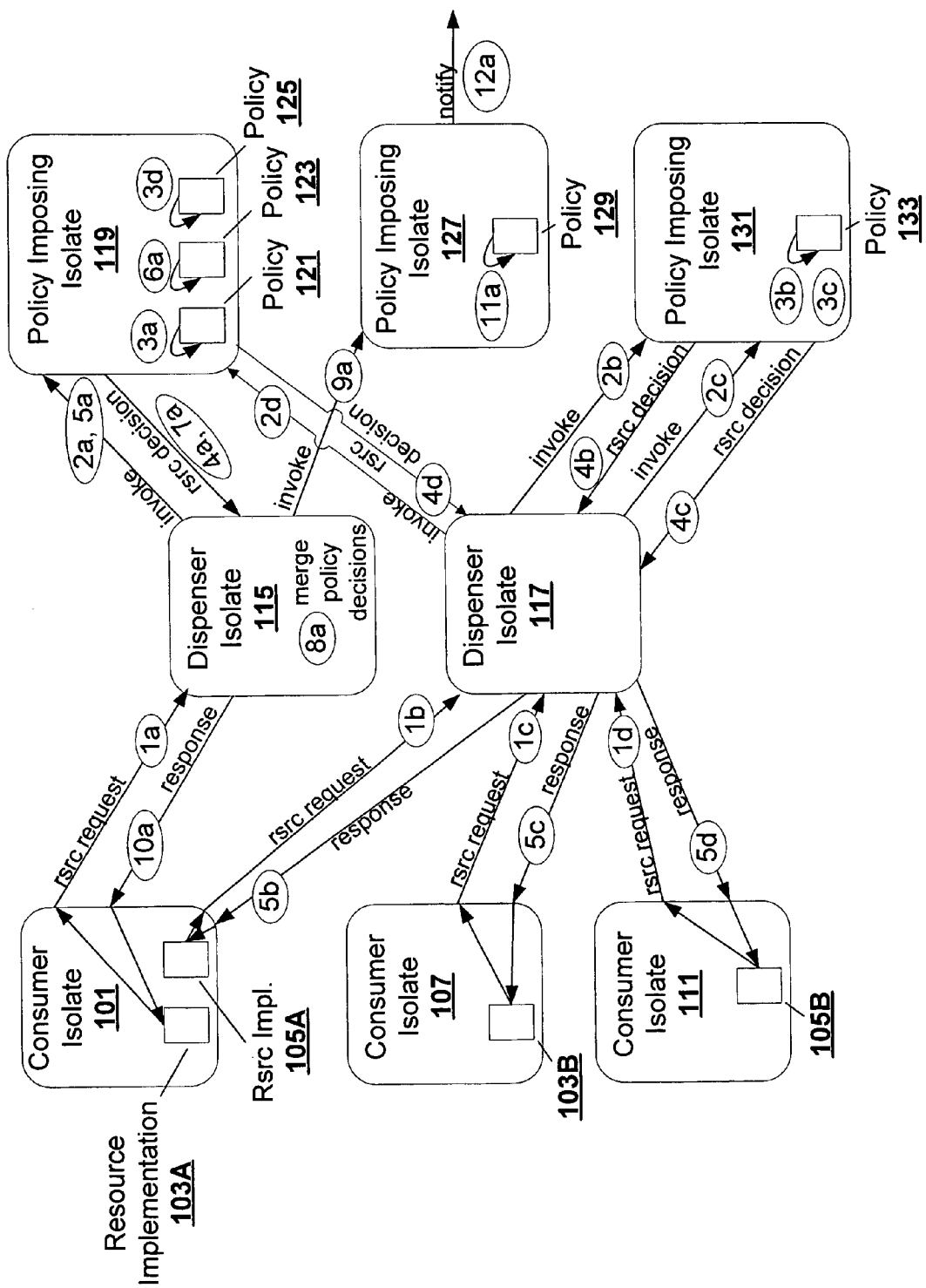
FIG. 1 depicts a conceptual diagram of isolate interaction for resource consumption according to some realizations of the invention.

The description that follows includes exemplary systems, methods, techniques, instruction sequences and computer program products that embody techniques of the present invention. However, it is understood that the described invention may be practiced without these specific details. In other instances, well-known protocols, structures and techniques have not been shown in detail in order not to obscure the invention.

Overview

The following description uses several terms to describe the invention. These terms include computation, resource, isolate, and resource management policy. A computation is one or more executing pieces of code that cause one or more tasks to be performed. Computations include entities that occupy an address space in system memory (e.g., processes, threads, applications, etc.). A resource is a measurable entity that one or more computations consume. Availability of a resource impacts performance, such that a shortfall may negatively affect performance and an abundance may improve performance. Conventional examples of resources include heap memory, the number of database connections or server threads in use, and processor time. An isolate is one or more computations that do not share state or objects with other computations (i.e., isolates do not share objects or state with other isolates). Java Specification Request 121 entitled "Application Isolation API Specification" provides an instance of a guideline for implementation of isolates. The described invention utilizes isolates as a unit of management. A resource management policy defines guidelines for consuming or unconsuming a resource, such as availability of a resource for computations requesting the resource.

Abstraction of resource management from platforms and native code (e.g., operating systems) provides extensibility and flexibility in resource management. Implementing an isolate that monitors and controls provision of a resource separate from definition of the resource, such as an intermediate posting facility for resource requests, abstracts management of the resource from consumption and provision of the resource. An isolate that monitors and controls provision of a resource is referred to herein as a dispenser isolate. A dispenser isolate monitors and controls provision of a resource by acting as a gateway for resource requests and responses.

Although management of a resource is separate from implementation of the managed resource, a dispenser isolate manages the resource based on some representation of the resource. Providing a generic representation of a resource facilitates abstraction of the resource while providing a basis for management of the resource. Common properties across a range of resources including conventional resources and new resources made possible by the described invention have been identified. These common properties or attributes across different resources allow a resource management facility (e.g., the dispenser isolate) to control and monitor resources without being aware of specific aspects of the resource's implementation. Abstracting resources from their implementation allows a dispenser class to be defined that is instantiable for any resource, regardless of specific implementation.

Providing a mechanism for representing association of a resource with a resource management policy, hereinafter referred to as a resource domain, and for binding isolates to resource domains provides efficient policy management and flexible application of resource management policies to isolates that consume resources. A single resource management policy independent of the particular resource implementation can be generated and associated with different resources. In addition, application of resource management policies to resource consuming isolates is not hindered by relationships between the resource consuming isolates, thus enhancing resource management in areas such as collaborative applications.

Furthermore, the separation of resource management and resource implementation illuminates novel techniques for controlling resource consumption. For example, a dispenser isolate can be used to control an isolate's rate of resource consumption by regulating or throttling resource requests.

Each of the described techniques and/or concepts is described in more detail below. The described subject matter can be implemented in a range of combinations including separately implementing each of them to implementing a resource management interface that includes all of the techniques and/or concepts described herein. The described invention also may be combined with other techniques or concepts not described herein.

Resource Management Interface

FIG. 1 depicts a conceptual diagram of isolate interaction for resource consumption according to some realizations of the invention. FIG. 1 includes consumer isolates 101, 107, and 111; dispenser isolates 115 and 117; and policy imposing isolates 119, 127, and 131. The consumer isolate 101 includes resource implementations 103A and 105A. A resource may be implemented by the underlying operating system, a virtual machine, a core library, trusted middleware code, a programming language runtime system, application classes, etc.

The consumer isolate 101 generates a resource request, which corresponds to the resource implementation 103A, and sends the resource request to the dispenser isolate 115 at a time 1a. The dispenser isolate 115 processes the resource request and invokes the policy imposing isolate 119 at a time 2a. The policy imposing isolate 119 imposes resource management policies 121, 123, and 125. The policy 121 corresponds to the resource of the resource implementation 103A. At a time 3a, the policy imposing isolate 119 makes a decision about the resource request based on the policy 121. At a time 4a, the policy imposing isolate provides its policy decision to the dispenser isolate 115. In this scenario, multiple policies are applied for the resource of resource implementation 103A, so the dispenser isolate 115 invokes the policy imposing isolate 119 again at a time 5a. Although the policy imposing isolate 119 is invoked for a second policy decision, different policy imposing isolates can be involved in various realizations of the invention. For example, a different policy imposing isolate may apply the policy 123. The policy imposing isolate 119 makes a decision based on the policy 123 at a time 6a and provides the decision to the dispenser isolate 115 at a time 7a. Although the separate policies are applied sequentially in FIG. 1, various realizations of the invention invoke policy imposing isolates differently (e.g., in parallel, in batches, etc.). In addition, the policies 121 and 123 may be combined into a single policy. At a time 8a, the dispenser isolate 115 merges the decisions provided by the policy imposing isolate 119. Although FIG. 1 depicts the dispenser isolate 115 merging policy decisions from a single policy imposing isolate, the described invention is not limited to merging decisions from a single policy imposing isolate. Realizations of the invention merge policy decisions from different policy imposing isolates.

After receiving and merging the policy decisions, the dispenser isolate 115 invokes a policy imposing isolate 127 at a time 9a. In FIG. 1, the invocation of the policy imposing isolate 127 is paired with one or more of the invocations of the policy imposing isolate 119. Various realizations of the invention implement association of pre-decision invocation and post-decision invocations differently (e.g., zero or more pre-decision invocations associated with zero or more post-decision invocations). At a time 10a, the dispenser isolate 115 responds to the consumer isolate 101 indicating the merged policy decision. The decision may be a full grant of the requested resource amount, a partial grant of the requested resource amount, or a deny of the request. At a time 11a, the policy imposing isolate 127 makes a policy decision with a policy 129. In FIG. 1, the policy imposing isolate 127 sends a notification to a third party isolate at a time 12a. The policy 129 may be any of a variety of policies defined by a user or generated by one or more computations that causes one or more operations to be performed based at least in part on the notification from the dispenser (e.g., the policy imposing isolate 127 may modify its behavior according to the notification, modify another isolate's behavior, etc.). As previously stated, the timing illustrated in FIG. 1 is meant to aid in understanding the described invention and not meant to be limiting upon the invention. The response at time 10a, the invocation at time 9a, the decision at time 11a, and the notification at time 12a can occur in a myriad of different timings. In addition, the letters a-d are used to indicate the relationship of actions with isolates and not meant to indicate sequential time relationships.

Isolates

Figure 2A:
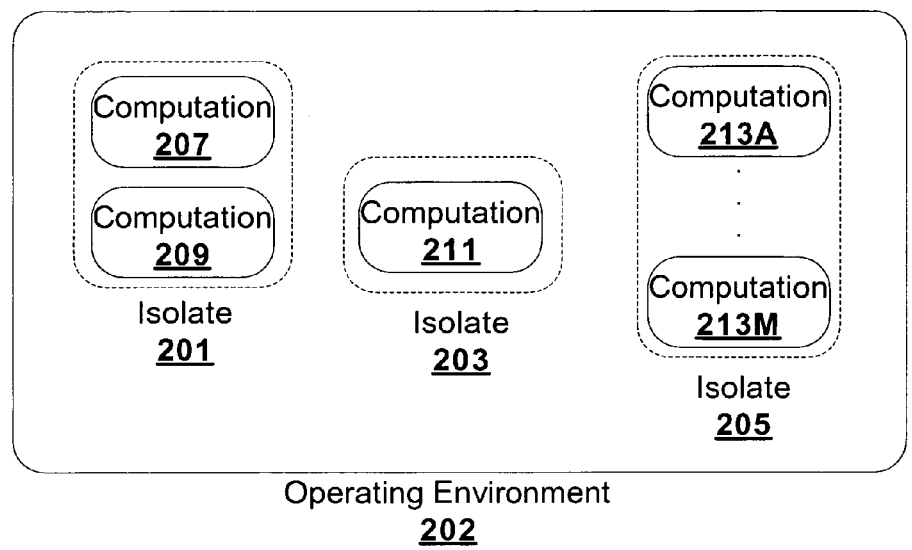
FIGS. 2A-2C depict various examples of isolates according to some realizations of the invention.
Figure 2B:
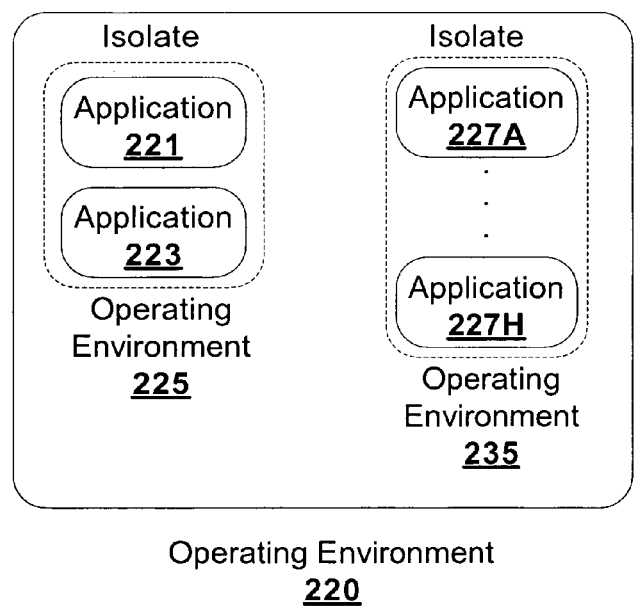
Figure 2C:
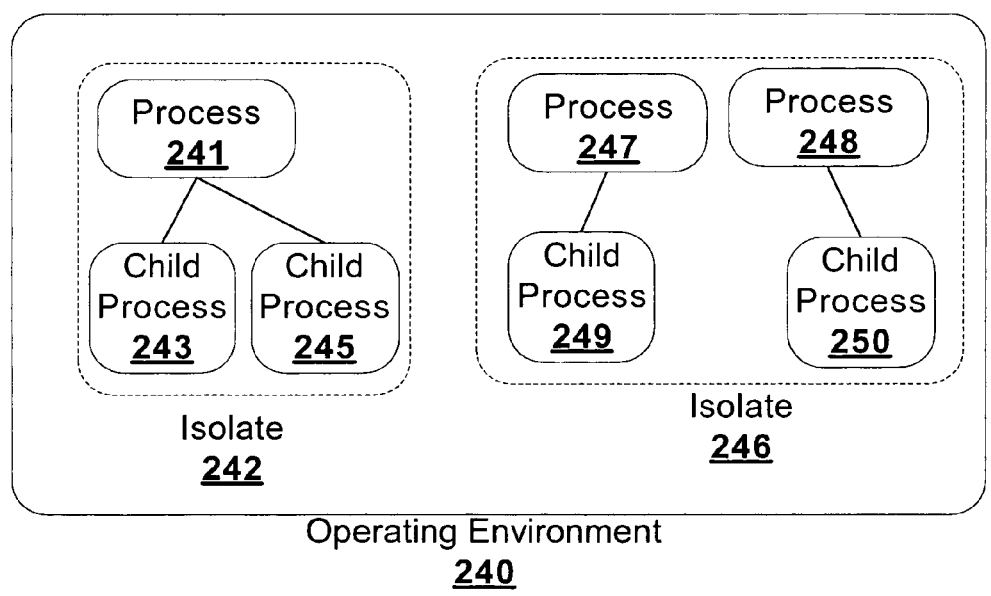

Modularization of resource consuming computations into isolates allows for unambiguous resource usage accounting and clean reclamation upon computation termination. FIGS. 2A-2C depict various examples of isolates according to some realizations of the invention. FIG. 2A depicts isolates comprising computations according to some realizations of the invention. An operating environment 202 (e.g., an operating system, virtual machine, etc.) includes isolates 201, 203, and 205. The isolate 201 includes computations 207 and 209. The isolate 203 includes a computation 211. The isolate 205 includes computations 213A-213M. The isolates in FIG. 2A illustrate the possible various number of computations comprising an isolate.

FIG. 2B depicts applications as isolates according to some realizations of the invention. An operating environment 220 (e.g., Windows®, Unix, Linux, DOS, OS/2, etc.) supports operating environments 225 and 235 (e.g., Java® virtual machines, .Net application domains, communication protocols, Java Runtime Environment, .Net common language runtime, Database Management Systems, etc.), which are each isolates in FIG. 2B. The isolate operating environment 225 supports applications 221 and 223 (e.g., applets, servlets, Enterprise beans, message services, SOAP services, etc.). The isolate operating environment 235 hosts applications 227A-227H.

FIG. 2C depicts processes as isolates according to some realizations of the invention. An operating environment 240 includes isolates 242 and 246. The isolate 242 comprises a process 241 and its child processes 243 and 245. The isolate 246 comprises a process 247, a child process 249 of the process 247, a process 248, and a child process 250 of the process 248.

The isolates depicted in FIGS. 2A-2C can assume any combination of the roles of a consumer isolate, a policy imposing isolate, and a dispenser isolate. In addition, an isolate can manage other isolates. For example, the isolate 203 may consume a resource, manage isolates 201 and 205, and impose policies on the isolates 201 and 205 that it manages. In another example, the isolates 201 and 203 consume a resource and the isolate 201 imposes that resource's management policy on the isolate 203 as well as on itself. The mechanism that allows for unrelated isolates to impose policies arbitrarily, referred to herein as a resource domain, will be described later.

Resource Management Policies

In addition to imposing resource management policies, isolates generate resource management policies. Resource management policies are configured directly by a user, loaded from a boot file, loaded from over a network, dynamically derived from another policy, etc. Various examples of types of resource management policies include usage limits, notifications, and reservations. A resource management usage limit policy defines when a computation may gain access to, or consume, one or more units of a given resource. Such a policy defines when a resource request is wholly granted, partially granted, or denied, or influences the decision to grant a particular request to consume a resource. Usage limit policies can range from simple to relatively complex. For example, a usage limit policy may be reactive (i.e., define provision of a decision based simply on being invoked). Another usage limit policy may define various calculations to be performed as a basis for a decision, define a threshold for comparison of proposed resource usage, or define various determinations with respect to another resource as a basis for providing a decision for the corresponding resource, etc. Resource management reservation policies specify reservations (guaranteed resource availability). Reservations are established and utilized in determining grant of a resource consume request.

Figure 3:
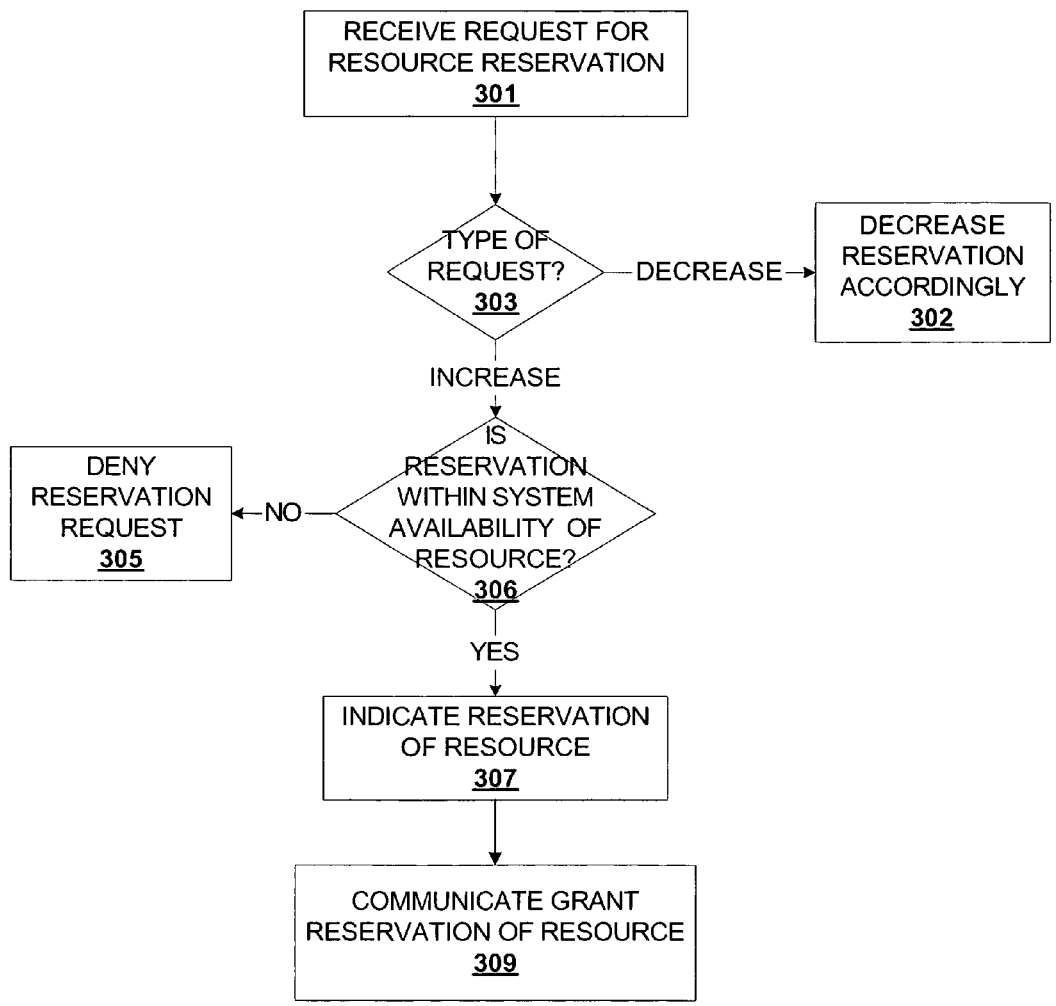
FIG. 3 depicts establishment of a reservation according to some realizations of the invention.

FIG. 3 depicts establishment of a reservation according to some realizations of the invention. At block 301, a request for resource reservation is received. For example, the dispenser receives the request to establish a reservation from an isolate acting as a policy imposing isolate, which may also be a consumer isolate. At block 303, the type of resource reservation request is determined. If the reservation request requests an increase, then control flows to block 306. If the reservation request requests a decrease, then control flows to block 302.

At block 302, the reservation is decreased accordingly.

At block 306, it is determined if the reservation request is within system wide availability of the resource. For example, the managing isolate would determine if other reservations will allow the requested reservation, if current usage allows the requested reservation, etc. If the reservation is not within system availability of the resource, then control flows to block 305. If the reservation is within system-wide availability of the resource, then control flows to block 307.

At block 305, the reservation request is denied.

At block 307, reservation of the resource is indicated. For example, an indication that 50 megabytes of system memory has been reserved is indicated. At block 309, grant of the reservation is communicated. For example, the managing isolate sends a message to the requesting isolate, either directly or indirectly, acknowledging establishment of the requested reservation.

As previously stated, policies include resource management notification type policies. Resource management notification policies notify interested isolates of an occurrence of a specific event, as with the depicted policy 129 of FIG. 1. An interested isolate's behavior is modified in accordance with the notification. These various policies allow for an expressive set of resource management policies to be coded.

Returning to FIG. 1, the consumer isolate 101 requests a resource that corresponds to the resource implementation 105A. The consumer isolate 101 communicates a resource request at a time 1b to the dispenser isolate 117, which manages the corresponding resource. The isolate 101 includes resource implementations for different resources, 103A and 105A, and communicates with distinct dispensers, which handle requests for distinct resources. The dispenser isolate 115 handles requests for the resource that corresponds to the resource implementation 103A and the dispenser isolate 105A handles requests for the resource that corresponds to the resource implementation 105A. The dispenser isolate 117 invokes the policy imposing isolate 131 at a time 2b. The policy imposing isolate 131 makes a decision about the resource request based on a policy 133 at a time 3b and provides the decision to the dispenser isolate 117 at a time 4b. The dispenser isolate 117 does not have additional policy decisions to merge and does not have another policy imposing isolate to invoke after the policy decision has been made, so the dispenser isolate 117 provides a response to the consumer isolate 101 at a time 5b.

The consumer isolate 107 also requests the resource managed by the dispenser isolate 117. The requested resource is reflected in the consumer isolate 107 as a resource implementation 103B. The consumer isolate 107 causes a resource request to be generated and communicated by the consumer isolate 107 at a time 1c to the dispenser isolate 117. At a time 2c, the dispenser isolate 117 invokes the policy imposing isolate 131. The policy imposing isolate 131 makes a policy decision with the policy 133 at a time 3c and passes the decision back to the dispenser isolate 117 at a time 4c. At a time 5c, the dispenser isolate 117 provides a response in accordance with the policy decision to the consumer isolate 107. The actions for the consumer isolate 111 to request the resource implemented in resource implementation 105B are similar to the already described request and response actions. The consumer isolate 111 requests the resource managed by the dispenser isolate 117. The resource implementation 105B causes a resource request to be generated at a time 1d, which is sent from the consumer isolate 111 to the dispenser isolate 117. At a time 2d, the dispenser isolate 117 invokes the policy imposing isolate 119. The policy imposing isolate 119 makes a policy decision with the policy 125 at a time 3d and passes the decision back to the dispenser isolate 117 at a time 4d. At time a 5d, the dispenser isolate 117 provides a response in accordance with the policy decision to the consumer isolate 111.

Dispenser

If management of the resources requested by consumer isolates 101 and 107 is not separated from implementations of those resources, then specific pieces of code would be developed for each resource. A dispenser allows the same code to be utilized for handling resource requests for different resources and for different consumer isolates. As illustrated in FIG. 1, monitoring and controlling resource consumption can be centralized with separation of resource management and resource implementation using a dispenser mechanism.

Figure 4:
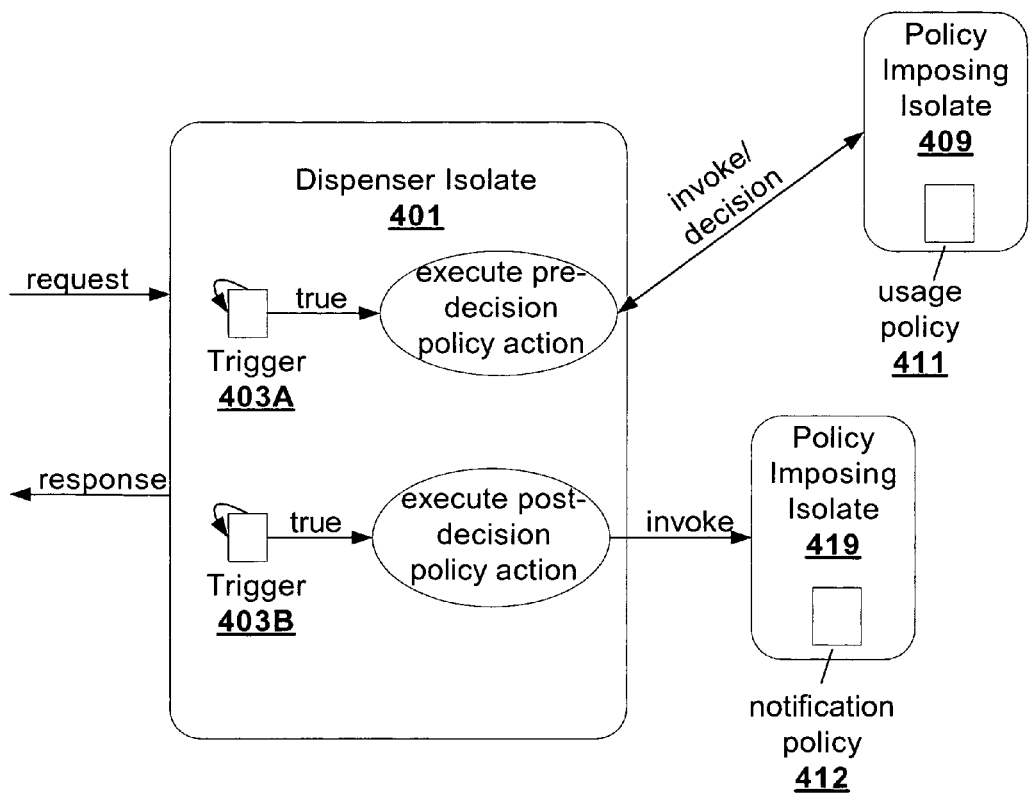
FIG. 4 depicts an exemplary dispenser isolate according to some realizations of the invention.

FIG. 4 depicts an exemplary dispenser isolate according to some realizations of the invention. A dispenser isolate 401 receives a request that is subject to a usage limit policy 411 and a notification policy 412. The dispenser isolate 401 determines an appropriate set of triggers and policy decision actions (described in more detail below) for the received request. Triggers and actions are not depicted in FIG. 1, because various realizations of the invention implement the functionality of monitoring and controlling resource requests differently. The policy decision actions relevant to a resource request can be executed and/or determined in a variety of ways. For example, realizations of the invention may execute all relevant policy decision actions for a resource request, and the policy decision actions include or activate facilities that make determinations with respect to the resource request. In other words, the functionality of regulating a resource request, performing calculations and/or making decisions about the resource request, providing the decisions, and merging decisions can be separated and/or merged in numerous ways, as well as implementing such separation and merging of functionality in many different ways. However, to avoid confusion and obfuscation, illustrations of the described invention include descriptions of triggers, thus aiding in understanding the described invention. The dispenser determines the appropriate set of action and triggers from the request (e.g., the request indicates the requestor, the request includes the name of a policy imposing isolate that imposes the appropriate actions and triggers, a reference to one or more memory locations that host the appropriate actions and triggers, an object or structure that indicates the appropriate actions and triggers, etc.), by looking up the set of actions and triggers (e.g., looking up the actions and triggers based at least in part on a request identifier, a requestor identifier, a hash of the requestor identifier and the resource, etc.), etc. Various realizations of the invention indicate the policies differently (e.g., names of policies, names of isolates that impose the policies, a reference value that corresponds to the policies or isolate, etc.). In FIG. 4, the dispenser isolate 401 has determined triggers 403A-403B as appropriate for the received request.

A dispenser isolate evaluates resource requests against a corresponding policy (e.g., a policy associated with the resource requestor, a policy associated with the dispenser isolate, a policy associated with the requested resource, a policy associated with a separate entity representing association between a resource and policies, etc.) Various realizations of the invention evaluate a resource request differently (e.g., directly against the corresponding policy, indirectly against one or more corresponding policies, against gate functions, etc.). For example, one or more policy decision actions may be executed upon receiving a resource request without resolving any triggers or gate functions; one or more triggers may be resolved before zero or more policy decision actions may be executed, etc.

Triggers function as gates in determining whether an associated policy decision action should be executed (e.g., whether a policy imposing isolate should be invoked). Triggers are executed by a dispenser and in an example implementation are serializable so they can be transported between isolates. The following is an illustration, in the form of Java® interface, of methods defined for a trigger:
public interface Trigger extends java.io.Serializable {
    public boolean shouldFire(long current);
    public boolean shouldFire(long current, long proposed);
}

As previously discussed, policy decision actions may be pre-decision (e.g., invocation of an isolate that imposes a usage limit policy) or post-decision (e.g., invocation of an isolate that imposes a notification policy). A dispenser utilizing the above exemplary definition of a trigger executes the shouldFire (long current) method from the trigger of a newly installed policy decision action to allow that action a chance to react to the resource's utilization state at the time of installation (perhaps by establishing a baseline that records current use. In addition, the dispenser, upon receiving a request to consume its resource, executes the shouldFire (long current, long proposed) method for each policy decision action to determine whether that action should be executed.

Triggers can be utilized to avoid unnecessary round trip inter-isolate communications by filtering out actions that do not need to be executed upon a given consume/unconsume resource request action. For example, assume the policy that corresponds to the trigger 403A rejects requests to consume more than 64 total megabytes of memory. If a consume request is for 5 megabytes of memory when current usage is at 50 megabytes of memory, then the trigger will not execute the corresponding policy decision action, which invokes a policy imposing isolate that would grant the consume request. Instead, the trigger grants the request. Hence, an unnecessary inter-isolate communication is avoided.

In FIG. 4, the dispenser isolate 401 evaluates the triggers 403A and 403B. If the trigger 403A resolves to true, then a pre-decision policy action that invokes a policy imposing isolate 409 is executed. If the trigger 403B resolves to true, then a post-policy decision action that invokes a policy imposing isolate 412 is executed. If either trigger resolves to false, then their corresponding actions are not executed. This does not suggest that if no triggers resolve to true then a resource request is implicitly denied (e.g., the resource request is further processed, the resource request is implicitly granted, etc.). Although FIG. 4 depicts two separate policy imposing isolates corresponding to two separate policy decision actions, the same policy imposing isolate may be invoked by both pre- and post-decision policy actions.

In FIG. 4, the trigger 403A corresponds to a pre-decision action that invokes the policy imposing isolate 409, which imposes the usage limit policy 411. The trigger 403B corresponds to a post-decision action that invokes the policy imposing isolate 419, which imposes the notification policy 412. The triggers 403A and 403B correspond to only one policy decision action for purposes of providing an illustrative example. In accordance with some previously described realizations of the invention, the trigger 403A may correspond to pre- and post-decision actions of a varying number. For example, the trigger 403A may cause the dispenser to invoke both pre- and post-decision policy actions associated with the policy-imposing isolate 409. If the policy imposing isolate 409 is invoked, then the policy imposing isolate 409 returns a policy decision to the dispenser isolate 401. If the post-decision policy action is executed, then the dispenser isolate 401 communicates to the policy imposing isolate 419 information related to the policy decision provided by the policy imposing isolate 411 (e.g., the decision corresponding to the pre-decision policy action, a sum decision that takes the decision from the isolate 411 into account, additional criteria, such as common resource attribute values, which will be described later, etc.). The policy imposing isolate 419 evaluates the notification policy 411 with regard to the communicated information and acts accordingly (e.g., modifying its own behavior, communicating with another isolate regarding the resource, modifying another isolate's behavior, etc.).

Various realizations of the invention implement a dispenser isolate, triggers, and policy decision actions differently. For instance, a dispenser isolate may resolve all triggers that correspond to a resource request before executing policy decision actions that correspond to triggers that resolve to true, execute a policy decision action after each trigger is resolved, etc. Triggers may be resolved asynchronously or synchronously. Policy decision actions without corresponding triggers may be executed before triggers are resolved, while triggers are being resolved, or after triggers are resolved. In addition, policy decision actions and triggers may have a dynamic relationship with a resource request or static relationship (i.e., the same set of triggers and policy decision actions may be executed each time a given consume isolate requests a particular resource or the set of policy decision actions may be different over time because policy imposing isolates add, remove, and/or modify triggers and/or policy decision actions).

Figure 5A:
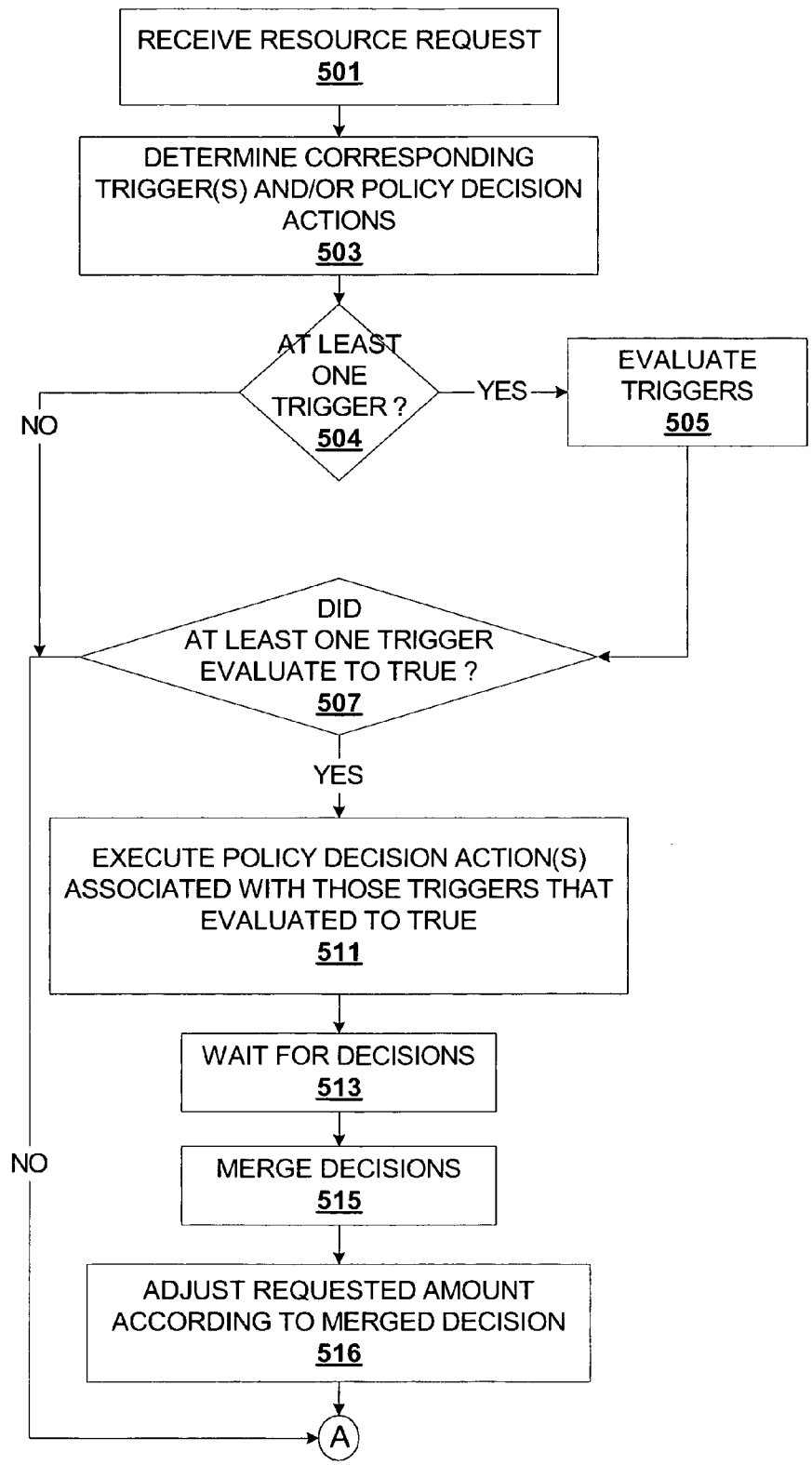
FIGS. 5A-5B depict flowcharts for a dispenser handling a resource request in light of reservations according to some realizations of the invention.
Figure 5B:
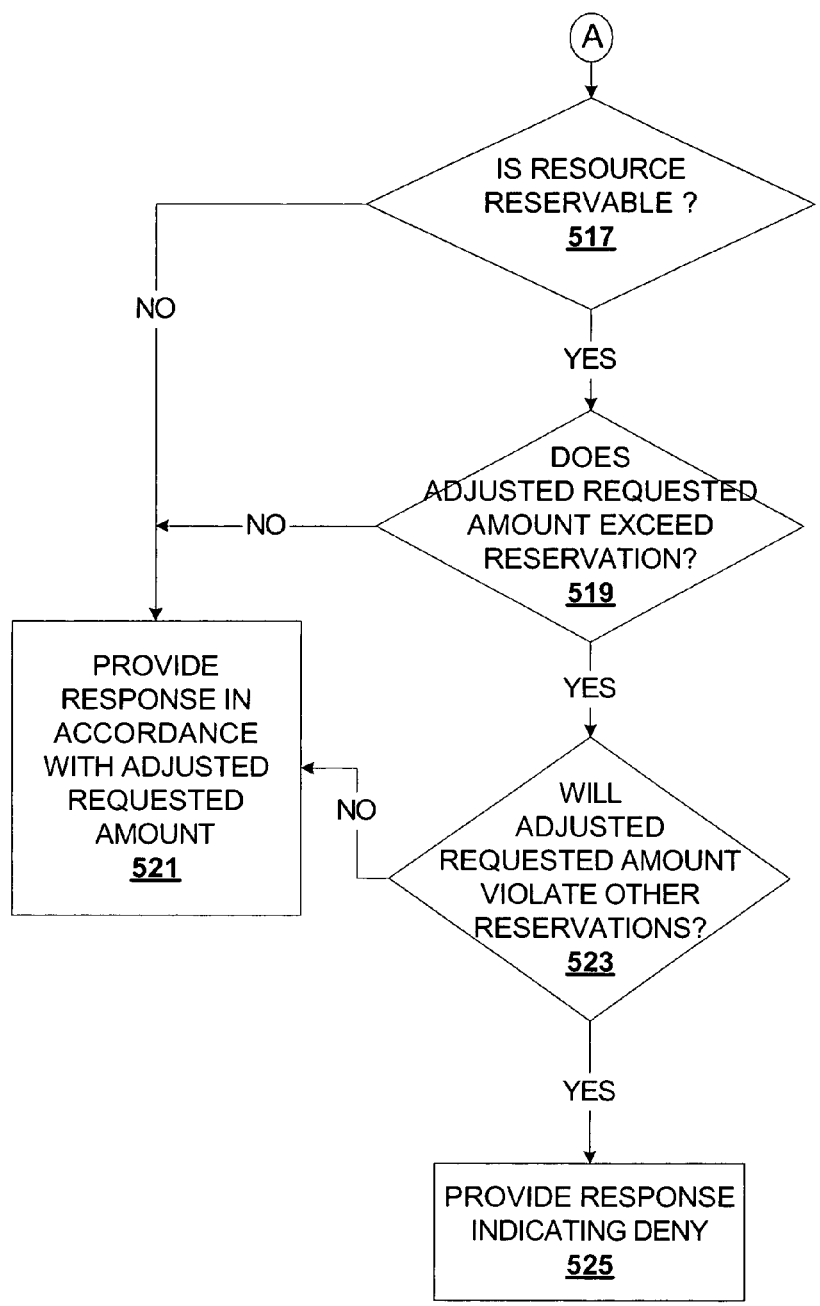

FIGS. 5A-5B depict flowcharts for a dispenser handling a resource request in light of reservations according to some realizations of the invention. FIG. 5A depicts a flowchart for a dispenser to execute triggers and policy decision actions according to some realizations of the invention. At block 501, a resource request is received. At block 503, the corresponding trigger(s) and/or policy decision action(s) are determined. At block 504, it is determined if there is at least one trigger. If there is not at least one trigger, then control flows to block 517. If there is at least one trigger, then control flows to block 505. At block 505, the determined triggers are evaluated or resolved. At block 507, it is determined if at least one trigger evaluated to true. If there is at least one policy decision action to execute, then control flows to block 511. If there is not at least one policy decision action to execute, then control flows to block 517.

At block 511, the one or more policy decision actions are executed. At block 513, the dispenser waits for policy decisions from the invoked policy imposing isolates. At block 515, the decisions are merged. At block 516, the requested amount is adjusted in accordance with the merged decision. Various realizations of the invention implement merging differently. A merging mechanism may select the lowest granted amount, the highest granted amount, the mean granted amount, etc. A merging mechanism may be dynamic, or adjustable. From block 516 control flows to block 517.

FIG. 5B depicts a flowchart, which continues from FIG. 5A, for verifying a merged decision against a standing reservation according to some realizations of the invention. At block 517, it is determined if the requested resource is reservable. If the requested resource is reservable, then control flows to block 519. Otherwise, control flows to block 521.

At block 521, a response in accordance with the adjusted requested amount is provided to the requesting consumer isolate.

At block 519, it is determined if the adjusted requested amount exceeds the reservation. If the adjusted requested amount exceeds the reservation, then control flows to block 523. If the adjusted requested amount does not exceed the reservation, then control flows to block 521.

At block 523, it is determined if the adjusted requested amount violates other reservations. If the adjusted requested amount violates other reservations, then control flows to block 525. If the adjusted requested amount does not violate other reservations, then control flows to block 521.

At block 525, a response that indicates denial of the resource request is provided to the requesting consumer isolate. Denial of the resource request may be explicit (e.g., a deny response), or implicit (e.g., a response that indicates zero granted amount, a response that indicates the currently used amount of the resource, which indicates that no more is granted, etc.).

Providing a single class definition of an entity to manage availability of resources increases developer efficiency and reduces the size and complexity of code. The following is an example class definition of a dispenser:

public abstract class Dispenser {
  public static Dispenser newInstance(String name,String[ ] args);
  public static void registerDispenser(Dispenser dispenser);
  public static void unregisterDispenser(Dispenser dispenser);
  protected boolean isGlobal( );
  protected final void setTotalQuantity(long totalQuantity);
  protected ResourceAttributes getResourceAttributes( );
}

A dispenser is created by invoking newInstance( ). This method takes the name of a Dispenser subclass as an argument, along with other arguments that define a particular instance of a dispenser. Once the dispenser is created, it can be registered—from that moment until de-registration, the dispenser is active. An active dispenser instance can begin to manage its resource. Once the instance of the dispenser is unregistered, it becomes inactive and cannot manage its resource unless registered again. After the instance of the dispenser becomes inactive, the dispenser can be destroyed.

The exemplary class definition above also provides for instantiating two kinds of dispensers: 1) a global dispenser and 2) a local dispenser. A global dispenser is shared by all isolates making use of the resource it manages. There is one global dispenser per resource per system (e.g., single computer system, a distributed system, etc.). However, there can be multiple instances of local dispensers in the system, but not more than one for the same resource in an isolate. Global dispensers model resources with a single source of "production." Some examples are heap memory in a single-heap system and the number of open sockets. Local dispensers model resources with multiple independent sources of production.

An example of multiple independent sources of production is execution of several web servers in a single virtual machine where each instance of the web server and each servlet is a separate isolate. Each server may independently control the maximum number of concurrent requests each of its servlets can execute. A dispenser can be instantiated locally for each server instance, because the servers need not coordinate with each other.

The example dispenser class also provides for associating the instantiated dispenser with the resource to be managed. The routine setTotalQuantity( ) sets a total quantity of a resource, if applicable, to be managed by the instantiated dispenser. The routine getResourceAttributes( ) attains attributes of a dispenser's resource to manage the resource. The attributes attained for the dispenser instance are common attributes across a broad range of resources. A dispenser instance manages a resource based on these common attributes. With these common attributes, a dispenser can be defined regardless of the resource.

Characterization of Resources Based on Common Attributes

The dispenser manages resource requests separately from the resource definitions, but the dispenser monitors and controls the resource requests based on more than the name of the resource. Various attributes have been identified that are common across conventional resources and that can be utilized to treat objects or entities, both logical (e.g., sockets, ports, servlets, etc.) and physical (e.g., CPU time, memory, etc.), as new resources in a uniform manner. Characterizing resources with a set of common attributes allows separation of resource management from resource definition and eases defining new resources. The single dispenser class handles resource requests based at least on the following attributes: disposable, revocable, bounded, and reservable. These four common attributes, and possibly more, determine the semantics of handling resource requests.

A resource is disposable if it is possible to identify a span of program execution over which a given resource instance is considered to be consumed. Outside of this span, the resource instance is available for (re)use. As a consequence, usage is not necessarily monotonic. A page of memory is a disposable resource; CPU time is not. An example of the usefulness of this attribute is in allowing unconsuming (i.e., returning to the pool of resources) of disposable resources only. The same operation for a non-disposable resource is erroneous.

A resource is revocable if units of the resource previously granted to the resource consumer can be withdrawn without affecting the consumer's behavior, except possibly for its rate of progress. An example is physical memory: the operating system can alter the size of the page frame pool it dedicates to a process's address space without the process noticing.

A resource is bounded if there is a fixed limit on the amount available. For example, in the absence of a constraint, such as a policy that constrains availability of a resource to a requestor when imposed, (perhaps issued by the underlying host platform), "absolute CPU time" is an unbounded resource.

After a successful reservation request of a reservable resource, it is guaranteed that the system is able to supply the reserved units of resource. This does not imply that a client may consume the resource, as that is also dependent on the resource usage limit policy. The definition is phrased in terms of resulting usage, rather than in terms of number of units requested. This distinction is emphasized, since the sum of requested units might overstate actual usage.

With the identified common attributes, dispensers can be instantiated from a single class definition to handle resource requests for a variety of resources (e.g., CPU time, memory, sockets, network bandwidth, interconnect bandwidth, etc.). Characterizations of resources with common attributes allows flexible management of an array of resources, both conventional and unconventional.

In addition to the described common resource attributes, the following additional attributes provide for precise accounting: granularity and measurement delay. The granularity of a resource is the indivisible amount of the resource in a given implementation. For instance, a heap might be managed as a set of pages; in this case, although the resource's unit is bytes or kilobytes, the deliverable granularity is the underlying system's page size, e.g., four kilobytes. Various realizations of the invention automatically round specified resource quantities to conform to granularity of the resource or round results of policy decisions to conform to granularity of the particular resource.

The measurement delay is the maximum amount of time that can pass between resource consumption and updating the usage information. For example, controlling the number of open file descriptors can be done accurately at any time (measurement delay is zero), whereas controlling CPU time usage via sampling once a second has a measurement delay of one second. An implication of measurement delay is the possibility of uncontrolled consumption during the delay interval. To reduce the possibility of uncontrolled consumption during a delay interval, the measurement delay can be made as small as desired.

Another common attribute that can be used to characterize resources is explicit. A resource is explicit if it is possible to identify a proper subset of the resource consumer's bytecodes such that a bytecode in the subset corresponds to a point at which the resource is consumed. A file descriptor is an example of an explicit resource; CPU time is not explicit. This property supports determination of whether and where in the program error handling related to resource shortage should be placed.

The following is an example of a resource attributes class definition:

```
public abstract class ResourceAttributes {
  public abstract long getGranularity( );
  public abstract long getMeasurementDelayMillis( );
  public final String getName( );
    {return getClass( ).getName( );}
  public abstract Unit getUnit( );
  public abstract boolean is Disposable( );
  public abstract boolean isReservable( );
  public abstract boolean isRevokable( );
  public abstract boolean isUnbounded( );
  public static ResourceAttributes getInstance(String name);
  public static ResourceAttributes[ ] getRegistered( );
}
```

Quantities of resources are expressible as long integers for usage, reservations, etc., in accordance with the exemplary dispenser class definition from above. An integer comparison is employed to tell whether two values are the same or one of them is greater than the other. The getUnit( ) method of ResourceAttributes returns a description of the unit, which may be expressed in several different systems (e.g., metric, US, etc.) and which can contain standard scaling prefixes (e.g., milli, kilo, etc.).

Resource Domains

With the dispenser class and the common resource attributes, resource management policies can be written abstractly for resources exhibiting common behavior as indicated by the common attributes, without regard for specific implementation of the resources. Resource domains extend policy utility from a different angle. Resource domains encapsulate a policy for a resource and allow for application of resource management policies to various unrelated computations. The resource domain provides a mechanism for associating a resource, a policy, and isolates that consume the resource. The representation of a resource and a particular policy for that resource allows for expression of numerous resource management scenarios and flexible application of resource management policies across isolates.

Figure 6:
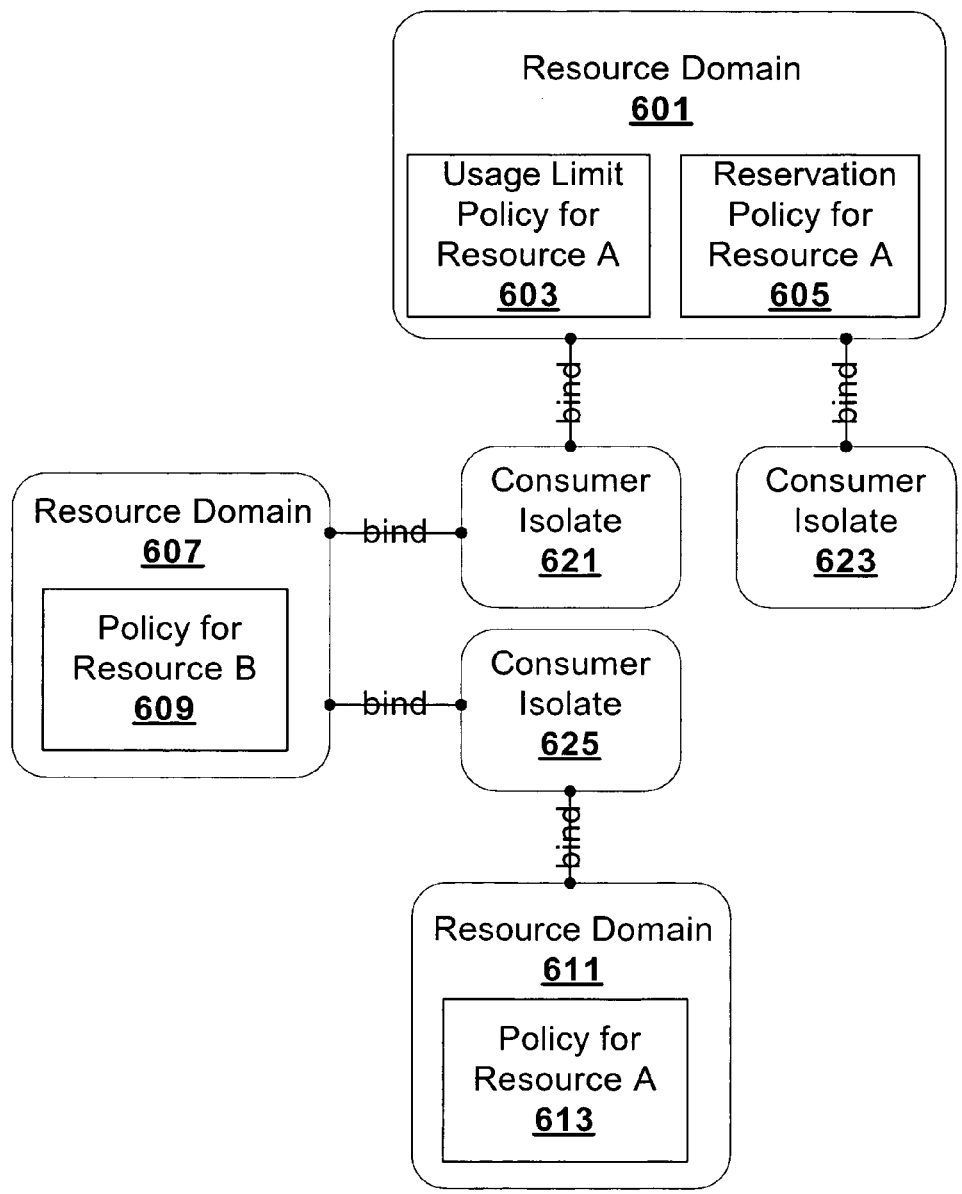
FIG. 6 depicts a conceptual example of resource domains according to some realizations of the invention.

FIG. 6 depicts a conceptual example of resource domains according to some realizations of the invention. A resource domain 601 includes a usage limit policy 603 for a resource A and a reservation policy 605 for the resource A. A resource domain 607 includes a policy 609 for a resource B. A resource domain 613 includes a policy 613 for the resource A.

A consumer isolate 623 is bound to the resource domain 601. A consumer isolate 621 is also bound to the resource domain 601. Even though the consumer isolates 621 and 623 are otherwise unrelated, both are bound to the same resource domain. Both of the consumer isolates 621 and 623 will be subject to the policies 603 and 605. Without resource domains, a single policy was applicable only to related processes and not applicable to unrelated processes. With resource domains, arbitrary application of policies to isolates allows for flexibility in resource management scenarios. For example, resources for a collaborative application can be managed with a set of policies applied to various isolates that cooperate on the collaborative application regardless of relationship. Hence, a set of policies for the collaborative application can be applied to unrelated computations without replicating the policy for each computation and without making such multiple policies coordinate their own operation.

In FIG. 6, the consumer isolate 621 is also bound to the resource domain 607. A consumer isolate 625 is bound to the resource domain 607 and the resource domain 611. The resource domain 611 includes a resource management policy 613 for resource A that is distinct from the policy for resource A defined by resource domain 601. From FIG. 6, it can be seen that resource domains enhance the expressiveness of policies. A policy can be written and applied to different resources with resource domains. For example, the policy 609 may be the same as the policy 603, or a combination of the policies 603 and 605, but applied to different resources via resource domains. The ability to utilize non-resource specific policies and apply them to different resources reduces the occurrence of redundant policies and allows users to more efficiently develop policies. In addition, relationships can be constructed between various client isolates and policies and modified over time using resource domains.

Figure 7:
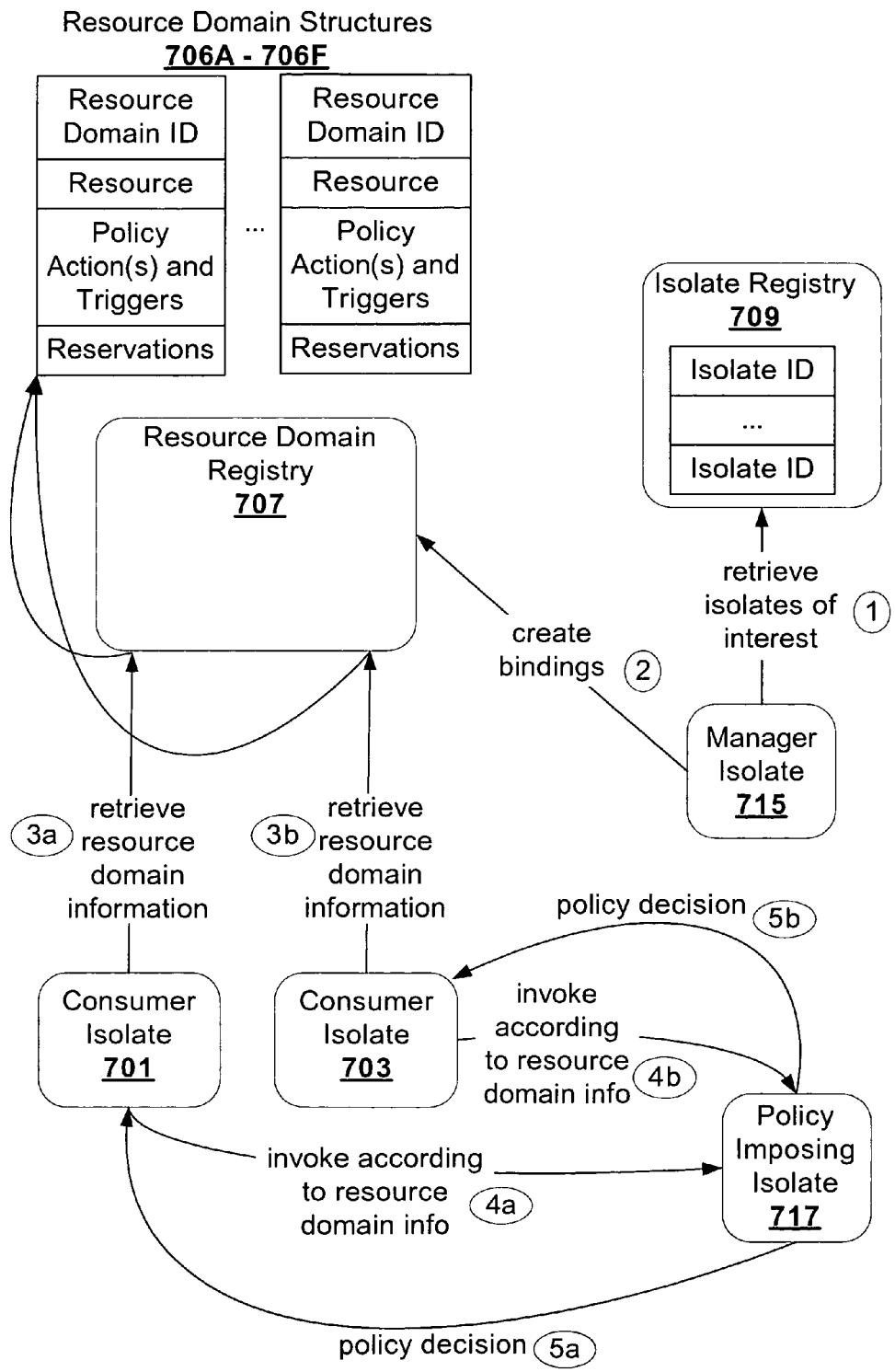
FIG. 7 depicts consumer isolates accessing a resource domain registry according to some realizations of the invention.

FIG. 7 depicts consumer isolates accessing a resource domain registry according to some realizations of the invention. A manager isolate 715 retrieves isolates of interest from an isolate registry 709 at a time 1. The isolate registry includes isolate identifiers. For example, a user selects from an isolate registry those isolates that the user wants to bind to a particular resource domain. The manager isolate 715 creates bindings at a time 2 in a resource domain registry 707. The resource domain registry 707 includes indications of the bindings between resource domains and isolates.

At a time 3a, a consumer isolate 701 retrieves resource domain information from the resource domain registry 707. At a time 3b, a consumer isolate 703 retrieves resource domain information from the resource domain registry 707. Assuming both of the consumer isolates 701 and 703 are bound to the same resource domain, the resource domain registry provides the same resource domain indication to the consumer isolates 701 and 703. For example, the consumer isolates 701 and 703 communicate their isolate identifier to the resource domain registry 707. An isolate that manages the resource domain registry 707 looks up the consumer isolate identifiers (e.g., a structure of resource domain references may be keyed or indexed by bound consumer isolate identifiers, a hash of bound consumer isolate identifiers, etc.). The consumer isolates 701 and 703 utilize the resource domain indications to access an appropriate one of the resource domain structures 706A-706F. In FIG. 7, a resource domain structure indicates a resource domain identifier, a resource (e.g., a resource name and/or resource attributes, one or more policy actions and triggers, reservations, and consumer isolates bound to the resource domain). The described resource domain structure and resource domain registry are exemplary and not meant to be limiting upon the invention. Various realizations of the invention implement a mechanism for relaying resource domain information to consumer isolates differently (e.g., a single access without indirection for looking up resource domain information, multiple levels of indirection, etc.) and/or encode resource domain information differently (e.g., with any of a variety of data structures, hardware, and organization of the resource domain information, which may include more or less than illustrated in FIG. 7). At a time 3b, the consumer isolate 703 retrieves resource domain information from the appropriate one of the resource domain structures 706A-706F.

At a time 4a the consumer isolate 701 invokes a policy imposing isolate 717 according to the retrieved resource domain information. The consumer isolate 703 also invokes, at a time 4b, the policy imposing isolate 717 according to the retrieved resource domain information. The policy imposing isolate 717 provides policy decisions to both consumer isolates 701 and 703. The policy imposing isolate 717 provides policy decisions to the consumer isolates 701 and 703 at times 5a and 5b, respectively.

The following provides an example class definition for a resource domain:

```
public final class ResourceDomain {
  public static ResourceDomain[ ] currentDomains( );
  public static ResourceDomain currentDomain(String name);
  public static ResourceDomain newDomain(String name);
  public ResourceAttributes getResourceAttributes( );
  public void bind(Isolate isolate);
  public void unbind(Isolate isolate);
  public Isolate[ ] getIsolates( );
  public long consume(long quantity);
  public long consumeAllOrNothing(long quantity);
  public long unconsume(long quantity);
  public void setConsumeAction(ConsumeAction action);
  public void removeConsumeAction(ConsumeAction action);
  public Reservation getReservation( );
  public void setReservation(Reservation reservation);
  public long getUsage( );
  public void terminate( );
  public boolean isTerminated( );
}
```

The static routines of the exemplary resource domain class return the set of resource domains to which the current isolate is bound, return a specific current resource domain given the resource name (throwing an exception if the resource is registered but not bound in the current isolate), and create a new resource domain. The attributes for the resource for which a resource domain is created are obtained via getResourceAttributes( ). This example shows how an isolate can discover all the resource domains it is bound to:

```
ResourceDomain[ ]  rds=ResourceDomain.currentDomains( );
for (int i=0; i<rds.length; i++) {
  String name=rds[i].getResourceAttributes( ).getName( );
  System.out.println("I am bound to"+name);
}
```

The bind( ) method binds an isolate to a resource domain. This method fails if the isolate is already bound to a domain for the same resource. The unbind( ) routine succeeds when the isolate has been terminated, when its consumption of the resource is zero or when the resource is non-disposable. An array of isolates bound to a given domain can be obtained via getIsolates( ). This is useful, for example, in determining whether an isolate is the only one bound to the domain and, consequently, the only one subject to the given resource management policy. Any isolate bound to a resource domain can request to consume units of the resource as well as unconsume units previously obtained, provided that the resource is disposable. These operations typically are invoked by core or middleware code implementing the resource. For example, client applications opening and closing sockets remain unchanged, but some of the socket operations may invoke consume( ) and unconsume( ) on the client's resource domain.

The consume( ) method can return less of a resource quantity than requested. Such partial grants of requests may be acceptable for certain resources. If an entire requested quantity is necessary for a given operation to succeed, resource implementations should use consumeAllOrNothing( ) (e.g., an attempt to allocate a 1 MB array should fail if only 512 KB of heap memory can be allocated). Invoking this routine does not guarantee the success of the request, but does prevent futile partial request satisfaction. Resource management policies are dynamically set by setting and removing consume actions and reservations on resource domains. Setting the reserved value to 0 removes a reservation.

Computations can learn about the quantities reserved. The getUsage( ) routine returns the number of resource units consumed by the resource domain. In realizations of the invention, all usage and reservation statements are with respect to resource domains, and no provisions are made for distinguishing consumption and reservations within isolates bound to the same resource domain. How much a given isolate consumes a given resource is not known unless it is the only isolate bound to its resource domain. Various realizations of the invention account resource usage based on individual requestors and/or provide mechanisms for distinguishing between reservations and consumption of resources for current usage.

Defining and generating a single set of one or more policies and applying the set of policies without replication to a group of unrelated computations provides efficient policy management and flexible application of resource management policies to consumer isolates. Resource domains reduce the burden on developers by providing an alternative to computation specific resource policies and reduce the burden of resource policy management on users.

Utilizing Resource Domains with Dispensers

A resource management interface that implements both a dispenser and a resource domain provides a powerful mechanism for managing resources and policies.

Figure 8:
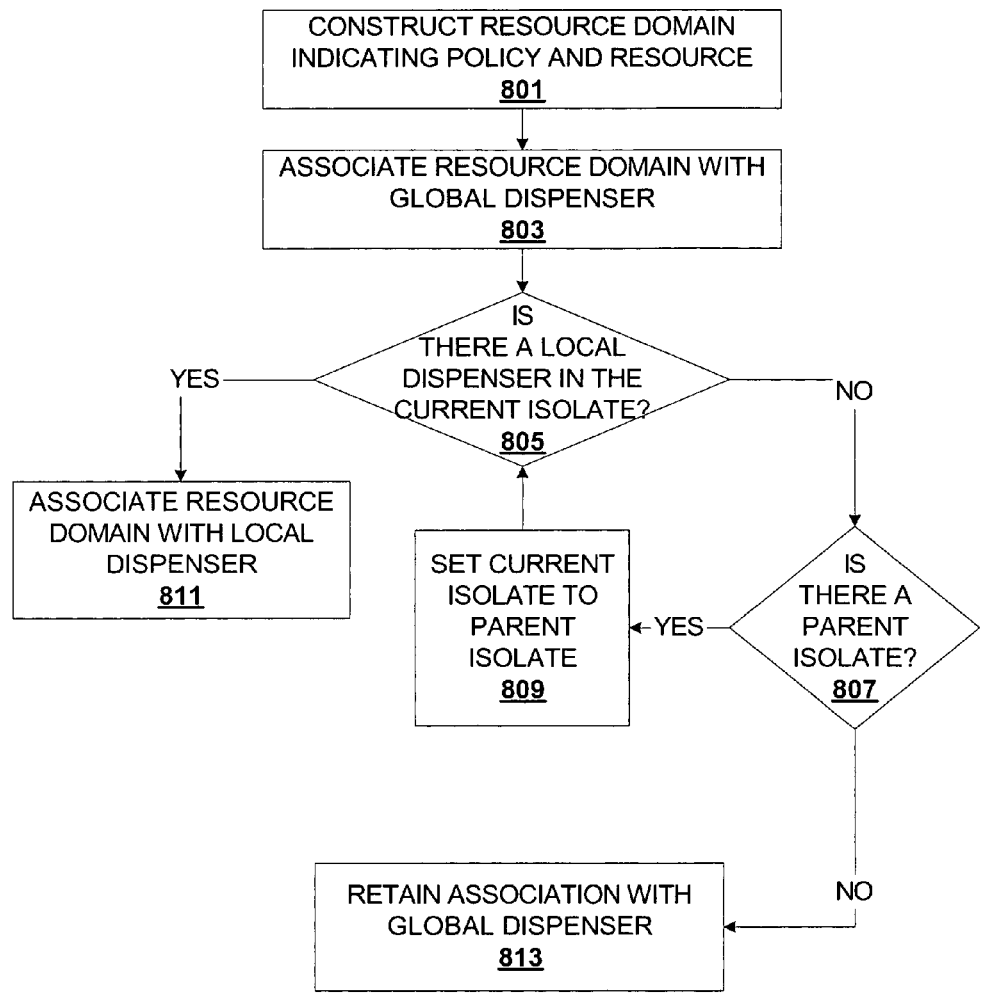
FIG. 8 depicts a flowchart for establishing a resource domain with a dispenser according to some realizations of the invention.

FIG. 8 depicts a flowchart for establishing a resource domain with a dispenser according to some realizations of the invention. At block 801, a resource domain that indicates a policy (e.g., a set of actions) and a resource is constructed. At block 803, the resource domain is associated with a global dispenser. At block 805, it is determined if there is a local dispenser in the current isolate. If there is not a local dispenser in the current isolate, then control flows to block 807. If there is a local dispenser in the current isolate, then control flows to block 811.

At block 811, the resource domain is associated with the local dispenser.

At block 807, it is determined if there is a parent isolate. If there is a parent isolate for the current isolate, then control flows to block 809. If there is not a parent isolate, then control flows to block 813. At block 813, an association with the global dispenser is retained.

At block 809, the current isolate is set to the parent isolate. Control flows from 809 to 805. After association of a resource domain with a dispenser, client isolates (i.e., consumer isolates) can be bound and unbound by isolates through the dispenser.

Figure 9A:
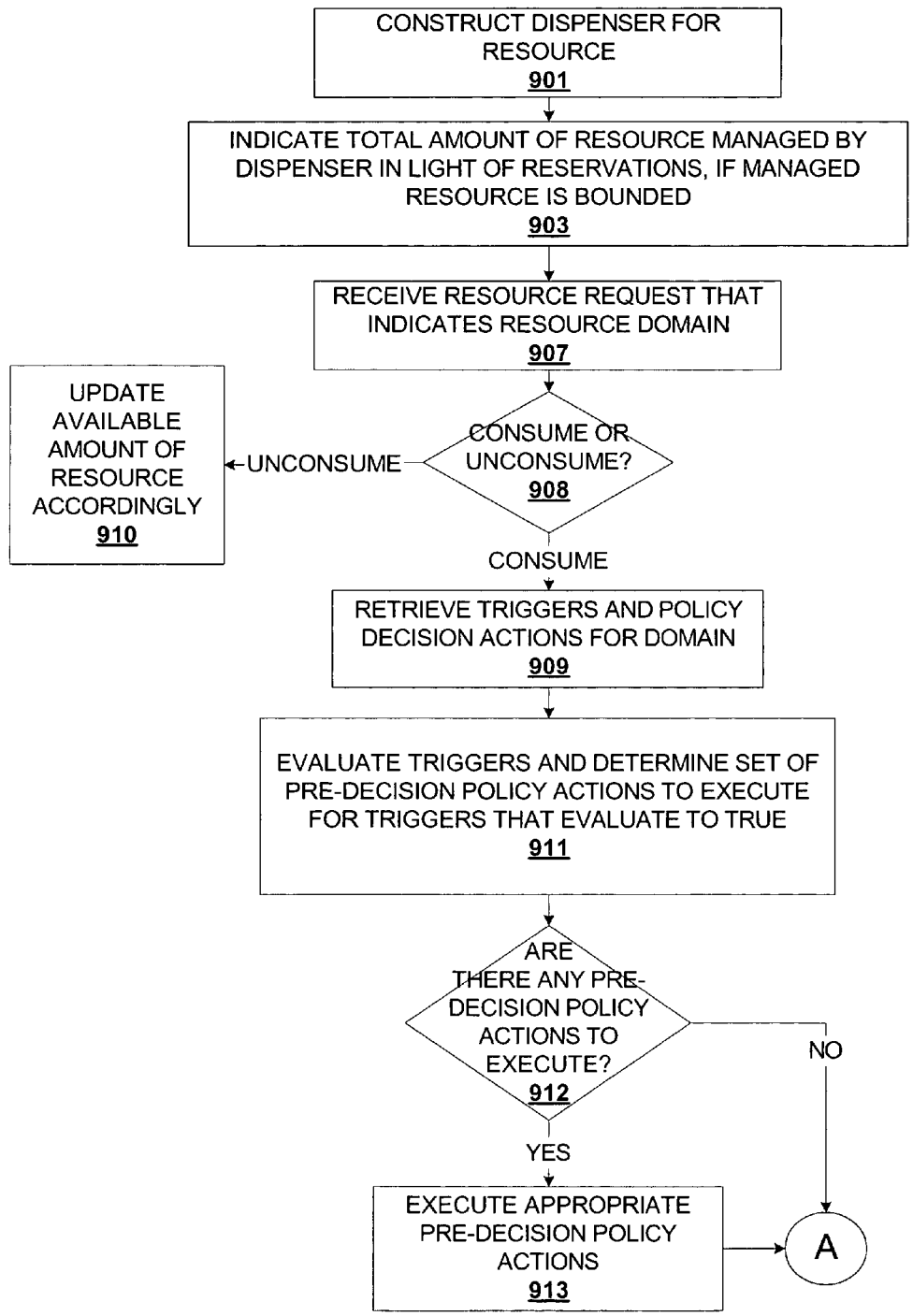
FIGS. 9A-9B depict flowcharts for a dispenser handling a resource request that indicates a resource domain according to some realizations of the invention.
Figure 9B:
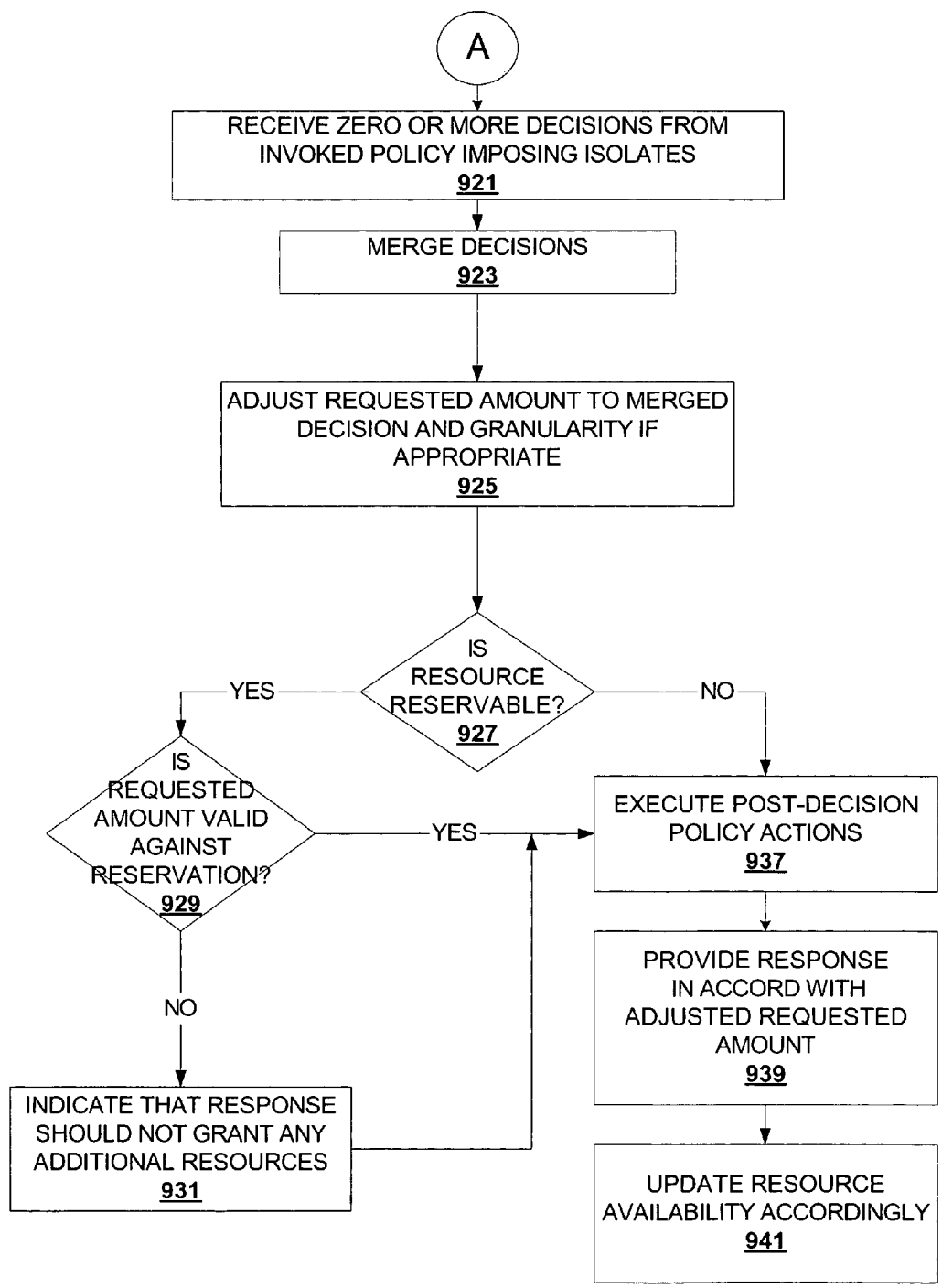

FIGS. 9A-9B depict flowcharts for a dispenser handling a resource request that indicates a resource domain according to some realizations of the invention. FIG. 9A depicts a flowchart for a dispenser to collect actions for a resource request that indicates a resource domain according to some realizations of the invention. At block 901, a dispenser is constructed for a resource. At block 903, an amount of the resource to be managed by the dispenser is indicated, if appropriate. If the resource is unbounded, then an amount is not indicated, an infinite amount is indicated, the unbounded attribute is indicated, etc. In addition, the amount indicated for management by the dispenser may take into consideration reservations of the resource. At block 907, a resource request that indicates a resource domain is received for the resource. At block 908, the type of resource request is determined. If the resource request is an unconsume request, then control flows to block 910. If the resource request is a consume request, then control flows to block 909.

At block 910, the available amount of the resource is indicated. An unconsume request will probably not be submitted for an unbounded resource. In realizations of the invention, the dispenser isolate verifies the legitimacy of an unconsumed resource request with the resource's disposable attribute. If the resource is disposable, then the unconsume resource request is legitimate. Otherwise, the unconsumed resource request is not legitimate, and an error indication is provided.

At block 909, triggers and policy decision actions for the indicated resource domain are retrieved (it may be that one or more policy imposing isolates have not installed triggers or actions with the resource domain). At block 911, the retrieved triggers are evaluated and a set of pre-decision policy actions to execute are determined. The set of pre-decision policy actions to execute includes those associated with triggers that resolved to true. At block 912, it is determined if there are any pre-decision policy actions to execute. If there are pre-decision policy actions to execute, then control flows to block 913. If there are no pre-decision policy actions to execute, then control flows to block 921.

At block 913, the appropriate pre-decision policy actions are executed. From block 913, control flows to block 921.

FIG. 9B continues from FIG. 9A and depicts a flowchart for handling received policy decisions according to some realizations of the invention. At block 921, zero (e.g., there are no pre-decision policy actions to execute because none of the triggers resolved to true) or more policy decisions are received from the policy imposing isolates invoked by the executed pre-decision policy actions. At block 923, the received policy decisions are merged. At block 925, the merged decision is adjusted in accordance with granularity of the resource. If the resource does not have a granularity indication, then block 925 may not be performed. At block 927, it is determined if the requested resource is reservable. If the resource is reservable, then control flows to block 929. If the resource is not reservable, then control flows to block 937.

At block 929, it is determined if the merged decision to be communicated (or policy decision without merging to be communicated) is valid against a reservation (e.g., does it exceed a corresponding reservation, violate another reservation, etc.). If the decision to be communicated is valid against the reservation, then control flows to block 937. If the decision to be communicated is not valid against the reservation, then control flows to block 931.

At block 931, it is indicated that a response should not grant any additional resources to the requestor. As previously stated, a request may be denied in accordance with different techniques (e.g., an explicit deny response indicating a negative value or flag, an implicit deny indicating a granted amount equal to current usage, an explicit deny indicating a granted amount of zero, etc.). A post-decision policy action may be executed that notifies interested isolates that the request has been denied.

At block 937, those post-decision policy actions whose triggers resolved to true are executed. At block 939, a response is provided in accordance with the merged policy decision. At block 941, availability of the resource is updated accordingly.

Figure 10A:
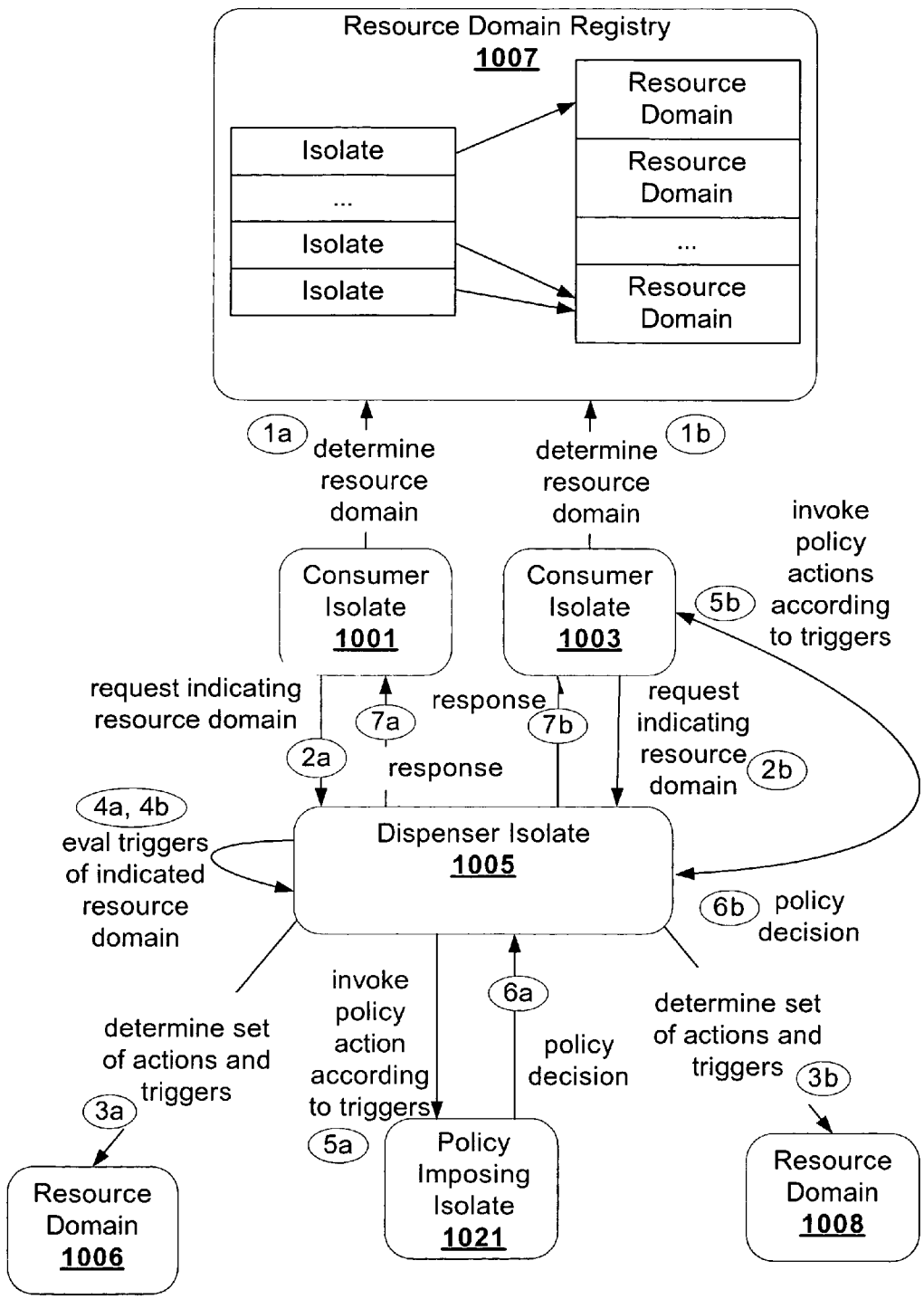
FIG. 10A depicts a conceptual diagram illustrating exemplary operation of a dispenser with resource domains according to some realizations of the invention.

FIG. 10A depicts a conceptual diagram illustrating exemplary operation of a dispenser with resource domains according to some realizations of the invention. A resource domain registry 1007 includes association of isolate indications and resource domain indications. The association or encoding of isolate indications and resource domain indications can be implemented with a variety of data structures (e.g., an array of isolate indicators referencing an array of resource domain indicators, a hash table with isolate indicators as keys or indices or hashes of the isolate indicators as keys or indices, a tree of isolate indicators that reference a list of resource domain indicators, etc.). In addition, the isolates and resource domains may be indicated in accordance with any of a number of techniques (e.g., alphanumeric identifiers, memory addresses, process identifiers, etc.). At a time 1a, a consumer isolate 1001 determines a resource domain from the resource domain registry 1007. The consumer isolate 1001 is bound to the determined resource domain. At a time 2a, the consumer isolate 1001 communicates a request that indicates the determined resource domain to a dispenser isolate 1005. A consumer isolate determines the identity of the dispenser isolate with a local mapping, which maps the consumer isolate's resource domain to the corresponding dispenser isolate. At a time 3a, the dispenser isolate 1005 accesses a resource domain 1006, indicated by the request from the consumer isolate 1001, and determines a set of triggers to evaluate and policy decision actions to execute for the resource request. At a time 4a, the dispenser isolate 1005 evaluates the triggers. At a time 5a, the dispenser isolate 1005 invokes a policy imposing isolate 1021 according to the evaluated triggers (i.e., actions that correspond to the triggers that evaluated to true are executed). If the executed policy decision action(s) is indicated as persistent, then it will continue to participate in the processing of subsequent resource consumption requests. Otherwise, the policy imposing isolate 1021 is eliminated (i.e., does not remain active) after providing its policy decision. At a time 6a, the policy imposing isolate 1021 delivers a policy decision to the dispenser isolate 1005. The dispenser isolate 1005 in turn provides a response to the consumer isolate at a time 7a.

Although not illustrated in FIG. 10, post-decision actions may be executed between times 6a and 7a. For example, the set of actions determined at times 3a and 4a may include post-decision actions. After the policy decision is provided at time 6a, a post-decision actions may be executed that causes the policy imposing isolate 1021 or another policy imposing isolate (in addition or instead of the policy imposing isolate 1021) to modify its own behavior, another isolate's behavior, etc.

Likewise, a consumer isolate 1003 determines its current resource domain from the resource domain registry 1007 at a time 1b. In various realizations of the invention, a consumer determines its corresponding resource domain a first time and maintains an indication of its resource domain as long as the consumer isolate persists if the binding between the consumer isolate and its resource domain is static. At a time 2b, the consumer isolate 1003 communicates a request that indicates the determined resource domain to the dispenser isolate 1005. At a time 3b the dispenser isolate 1005 determines a set of actions and triggers from a resource domain 1008 as indicated by the consumer isolate 1003. At a time 4b, the dispenser isolate 1005 determines the set of actions and triggers. If the consumer isolate 1003 was bound to the same resource domain as the consumer isolate 1001, then the dispenser isolate would evaluate the same set of triggers. In some realizations of the invention a set of triggers and actions are static in the dispenser across different consumer isolates bound to the same resource domain. If the set of triggers and actions are static, then the dispenser 1005 maintains the set of triggers and policy actions with an indication of the corresponding resource domain. The information indicated by the resource domains 1006 and 1008 may be the same as the resource domain information indicated by the resource domain structures illustrated in FIG. 7, possibly including less information or more information, such as current usage.

At a time 5b, the dispenser isolate 1005 invokes a policy imposing isolate (i.e., executes actions of triggers that resolve to true), which happens to be the consumer isolate 1003 in this example. The consumer isolate 1003 provides a policy decision to the dispenser 1005 at a time 6b. At a time 7b, the dispenser isolate 1005 provides a response to the consumer isolate 1003. As discussed above, post-decision policy actions may be executed between times 6b and 7b.

Figure 10B:
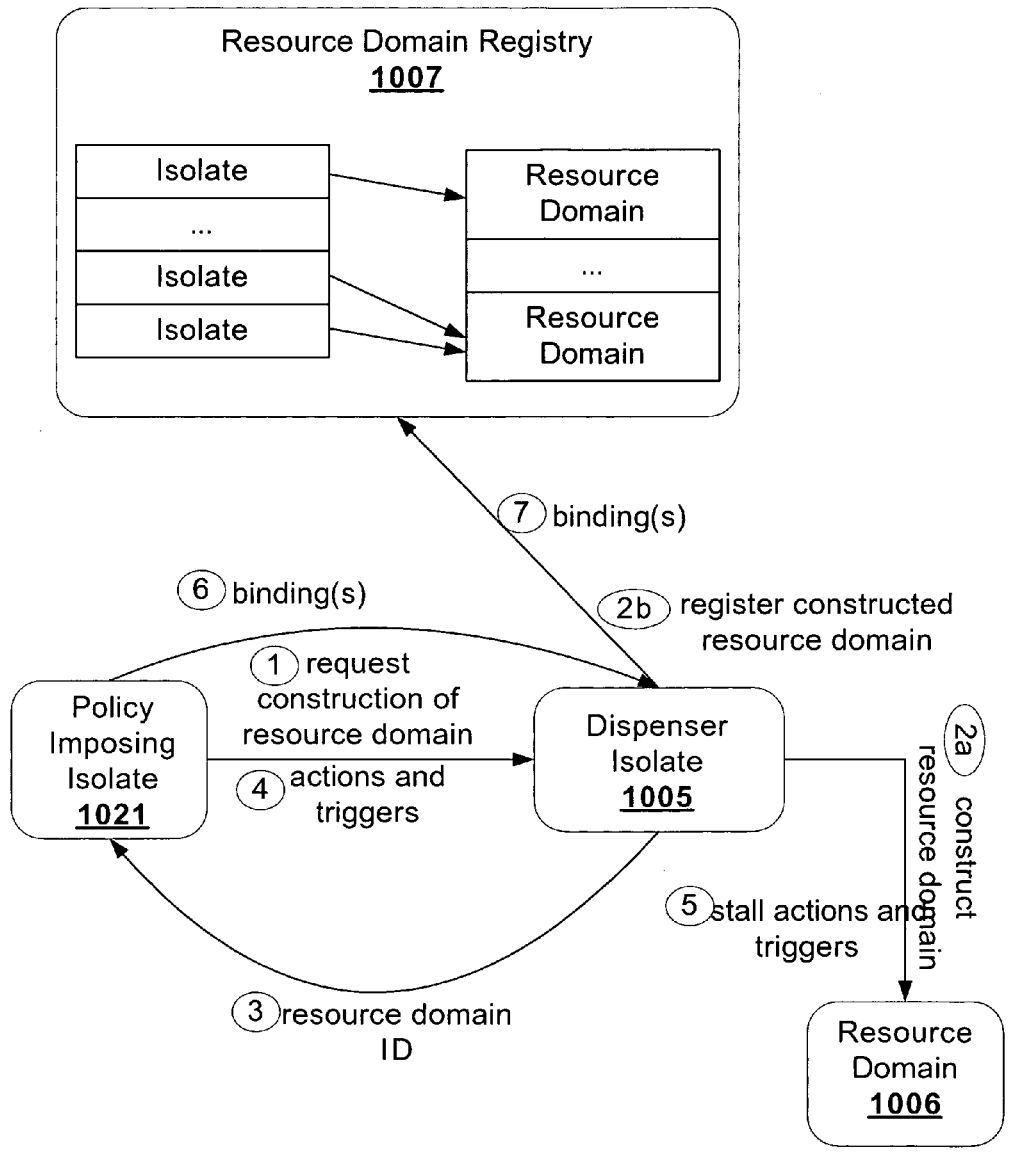
FIG. 10B depicts creation of a resource domain using a dispenser according to realizations of the invention.

FIG. 10B depicts creation of a resource domain using a dispenser according to realizations of the invention. The policy imposing isolate 1021 requests construction of a new resource domain at a time 1. At a time 2a, the dispenser isolate 1005 constructs the resource domain 1006. At a time 2b, the dispenser isolate 1005 registers the resource domain 1006 in the resource domain registry 1007. The registering of the resource domain 1006 may also include indicating the dispenser isolate's identity. The operations at times 2a and 2b may occur in parallel, 2a may occur before 2b, 2b may occur before 2a, etc. At a time 3, the dispenser isolate indicates the resource domain's identifier to the policy imposing isolate 1021. At a time 4, the policy imposing isolate 1021 indicates actions and triggers to the dispenser 1005. The dispenser isolate 1005 installs the actions and triggers from the policy imposing isolate 1021 in the resource domain 1006 at a time 5. As previously stated, the policy imposing isolate 1021 (and possibly other policy imposing isolates) can request installation of actions and/or triggers at various times and in different numbers. The illustration of the triggers and actions being installed immediately after construction of the resource domain 1006 is for illustrative purposes alone. At a time 6, the policy imposing isolate 1021 and/or another isolate indicates one or more isolates to be bound to the resource domain 1006. The dispenser isolate 1005 indicates the binding(s) in the resource domain registry 1007 at a time 7. The dispenser isolate 1005 may be visible or transparent in the actions illustrated in FIG. 10B. In addition, as previously discussed, a dispenser isolate may not be involved in creation of resource domains and bindings of isolates and resource domains.

An exemplary resource management interface as described in FIG. 10 utilizing the exemplary class definitions described above may also include the following routines in the resource domain class definition:
public long getTotalUsage( );
public long getTotalQuantity( );
public long getTotalReservedQuantity( );

These routines are provided to obtain information related to all resource domains associated with the same dispenser: getTotalUsage( ) returns the total amount of consumption, getTotalQuantity( ) returns the total amount of the resource in care of the dispenser, and getTotalReservedQuantity( ) returns the sum of all reservations on the resource domains associated with the dispenser. These routines are particularly useful in determining how large new reservations can be.

A resource management application programming interface that provides for a dispenser and/or a resource domain is applicable to a variety of resource management scenarios and allows for expression of numerous resource management policies. Such a resource management API hides from computations whether a resource is managed by an underlying operating system, a virtual machine, a core library, trusted middleware code, etc. Although implementation based on such a resource management API may take advantage of specialized hardware support of a particular platform, the implementation will not depend on such support.

The following is example code implemented with the exemplary class definitions provided above. The following code example refers to policy decision actions as "callbacks." Accordingly, pre-decision policy actions are referred to a pre-consume callbacks and post-decision policy actions are referred to as post-consume. callbacks.

```
public static void main(String[ ] args) {// class Manager
    String R=args[0]; // get name of resource to manage
    ResourceDomain rd0=ResourceDomain.currentDomain(R);
    ResourceDomain rd1=ResourceDomain.newDomain(R);
    long reservation=rd0.getReservation( ).getValue( );
    rd0.setReservation(new Reservation(reservation-100));
    rd1.setReservation(new Reservation(100));
    ConsumeCallback.Pre preCallback=new ConsumeCallback.Pre( )
```

```
{
    public long preConsume(ResourceDomain rd,long cur-
        rent,
        long proposed) {
        String name=rd.getResourceAttributes( ).getName( );
        log("Reject"+(proposed-current)+"of"+name);
        return current; // veto the request}
}};
Trigger trigger=Triggers.newAbsoluteUp(100);
ConsumeAction action=
new ConsumeAction(false, true, preCallback, trigger);
rd1.setConsumeAction(action);
Isolate iA=new Isolate("Trusted", new String[0]);
rd0.bind(iA);
Isolate iB=new Isolate("App", new String[0]);
rd1.bind(iB);
iA.start(new Link[0]);
iB.start(new Link[0]);
}
```

Manager is the initial isolate, which is assumed to be bound to a domain for a resource denoted by a string variable R. R can be any resource for this particular example of the resource management interface—the code to manage it is the same. The example code illustrates that policies can be expressed abstractly and parameterized by resource names.

The manager obtains a handle rd0 to its domain and creates another domain rd1 for the same resource. Then it sets a reservation for 100 units of R on the new resource domain after lowering its own reservation by the same amount and sets a consume action. The action consists of a non-persistent (removed after the first execution; the false argument), synchronous (blocking the consume request; the true argument) pre-event (also referred to as a pre-callback) ("pre" indicates that it is invoked before requests to consume resources are granted) and a trigger, which determines under what circumstances the callback should be executed. A trigger is predefined that causes the action's callback to be executed when usage increases to or beyond the specified threshold value. The callback, an example of which will be provided later, itself has three arguments: the resource domain against which the requested usage will be charged if granted (it is the same domain on which the consume action has been set), the current usage, and the proposed usage.

Returning the current usage value indicates that the request for an additional quantity (proposed minus current) is refused. This consume action constitutes a constraint that prevents isolates bound to rd1 from using more than 100 units of R. After completing this setup, the manager creates a new isolate iA, which will execute the Trusted main class and binds it to rd0—from now on the manager and iA will share rd0. This means that any usage of R by the manager or by Trusted is accounted against rd0, and the two isolates share the same resource management policy (reservations, consume actions, etc.) Finally, a new isolate iB executing main class App is created and bound to rd1; iB is thus subject to the policy the manager defined.

An example implementation of callbacks is as follows:
```
public interface ConsumeCallback {
    public interface Pre extends ConsumeCallback {
        public long preConsume(ResourceDomain domain,long
            currentUsage,long proposedUsage);
    }
    public interface Post extends ConsumeCallback {
        public void postConsume(ResourceDomain domain, long
            previousUsage,long grantedUsage);
    }
    public interface PreAndPost extends Pre, Post { }
}
```

Pre-consume callbacks are executed prior to the dispenser's handling of the consume request. The preConsume( ) routine has three arguments: the resource domain on which the consume request has been issued, the current usage, and the proposed usage—that is, the current usage increased by the requested amount, rounded up to meet granularity requirements. The value returned by preConsume( ) indicates to the dispenser how much of the request should be granted. A pre-consume callback that always denies the request would return currentUsage. Return values outside of the [current Usage, proposedUsage] range are ignored. As multiple consume actions may be invoked on any consume, the dispenser combines the return values of pre-callbacks (merges policy decisions). The default policy is to take the minimum, rounded up to the nearest granularity multiple. Finally, pre-consume callbacks are executed synchronously with respect to the consume request and prior to its completion.

Pre-consume callbacks and their triggers can be thought of as programmable constraints. In addition to denying the request, they can lower it or grant it unaltered, and, regardless of the outcome, they can arbitrarily modify the behavior of an isolate bound to the resource domain.

In contrast to pre-consume callbacks, post-consume callbacks execute after the dispenser executes the triggered constraints and decides how much of the request should be granted. Post-consume callbacks can be viewed as notifications. They inform the isolate that set them about resource consumption decisions and allow for adjusting behavior to operate in changed conditions. A callback may implement any of ConsumeCallback's subinterfaces, including ConsumeCallback itself. For example, a callback that implements ConsumeCallback itself can be useful in conjunction with rate-limiting triggers that never actually fire. There is no requirement that all consume actions to which a given isolate is bound be set by the same entity. Isolates can impose notifications on themselves so that they can react to triggered constraints. An isolate can impose constraints on other isolates and thereby act as a resource manager for a set of isolates. For instance, a computation may require notification whenever its heap memory usage exceeds a certain threshold, and upon receiving the notification, it may remove some items from its private in memory cache to lower its memory consumption and thus avoid violating a constraint. In the following example, an isolate sender is bound by its creator to resource domains for CPU time and outgoing network traffic:
```
ResourceDomain.currentDomain(CPU_TIME).bind
    (sender);
ResourceDomain.currentDomain(NET_OUT).bind(sender);
```
The isolate can then specify notification policies for these two resources to be informed about excessive usage of either of the two resources and switch between two states: sending data in the uncompressed format if the most recent callback was caused by using more than 90% of the CPU time or sending data in the compressed format if the most recent callback was caused by using more than 1 MB/s of network bandwidth. An example code implementation is provided below:
```
// code in sender's main:
class ToggleCallback implements ConsumeCallback.Post {
    public void postConsume(ResourceDomain rd, long
        previousUsage,long grantedUsage) {
        String name=rd.getResourceAttributes( ).getName( );
        if (name.equals(CPU_TIME))
            setCompressing(false);
```

```
    else if (name.equals(NET_OUT))
        setCompressing(true);
    }}
ConsumeCallback callback=new ToggleCallback( );
    ResourceDomain.currentDomain(CPU_TIME).setCon-
        sumeAction(new ConsumeAction(true, false, callback,
        new RateDetectingTrigger(1000, 900))); // ms
    ResourceDomain.currentDomain(NET_OUT).setCon-
        sumeAction(new ConsumeAction(true, false, callback,
        new RateDetectingTrigger(1000, 1*MB)));
```

RateDetectingTrigger triggers the associated callback when the rate of consumption is too high.

Another example code implementation with the already described exemplary class definitions is provided below to further illustrate realizations of the invention.

```
public static void main(String[] args) { // class App
    String R = args[0]; // get name of resource to manage
    ResourceDomain rd = ResourceDomain.currentDomain(R);
    long reserved = domain.getReservation( ).getValue( );
    if (rd.getIsolates( ).length != 1 || reserved < 50)
        error("I don't like this ...");
    ConsumeCallback cRed = new ConsumeCallback.Post( ) {
        void postConsume(ResourceDomain rd, long previous, long
            granted) {
            // Arrange to decrease consumption immediately!
        }};
    Trigger tRed = Triggers.newAbsoluteUp(reserved – 5);
    ConsumeAction red = new ConsumeAction(true, false, cRed,
        tRed);
    rd.setConsumeAction(red);
    ConsumeCallback cGreen = new ConsumeCallback.Post( ) {
        void postConsume(ResourceDomain rd, long previous, long
            granted) {
            // R abundant, OK to increase its consumption
        }};
    Trigger tGreen = Triggers.newAbsoluteDown(5);
    ConsumeAction green = new ConsumeAction(true, false, cGreen,
        tGreen);
    rd. setConsumeAction(green);
        // go about consuming ...
}
```

After obtaining a handle to its domain for R, App makes sure that there are no other isolates bound to it and that at least 50 units of the resource are available. It then creates two consume actions. Both are persistent, asynchronous, and "post," which means that when they trigger, they are executed asynchronously immediately after the dispenser commits to allowing (or denying) a resource consumption request. The red consume action triggers when usage is just five units below the reserved quantity; the goal of its associated callback is to inform the rest of the computation that lowering its consumption of R is imperative. The green consume action has a dual goal: whenever R is abundant (its consumption drops to no more than five units), the imperative conservation state is rescinded, and the computation may resume consuming R freely. Both of these actions behave as notifications; they inform the application of a change in its resource consumption state.

Controlling Rate of Resource Consumption

In addition to exerting control over the amount of resource consumption, actions can be utilized for controlling the rate of resource consumption. Instead of extending a conventional thread scheduler with interfaces for influencing its scheduling decisions, or adding a set of rate-controlling routines to the resource management class definitions, consumption requests can be throttled until they match a desired or threshold consumption rate. Throttling resource requests to control resource consumption rate utilizes the ability to gain control at every resource consumption point with an intermediate resource request handler (e.g., the dispenser) and implies the ability to delay the consuming computation or isolate at each of those points.

Figure 11:
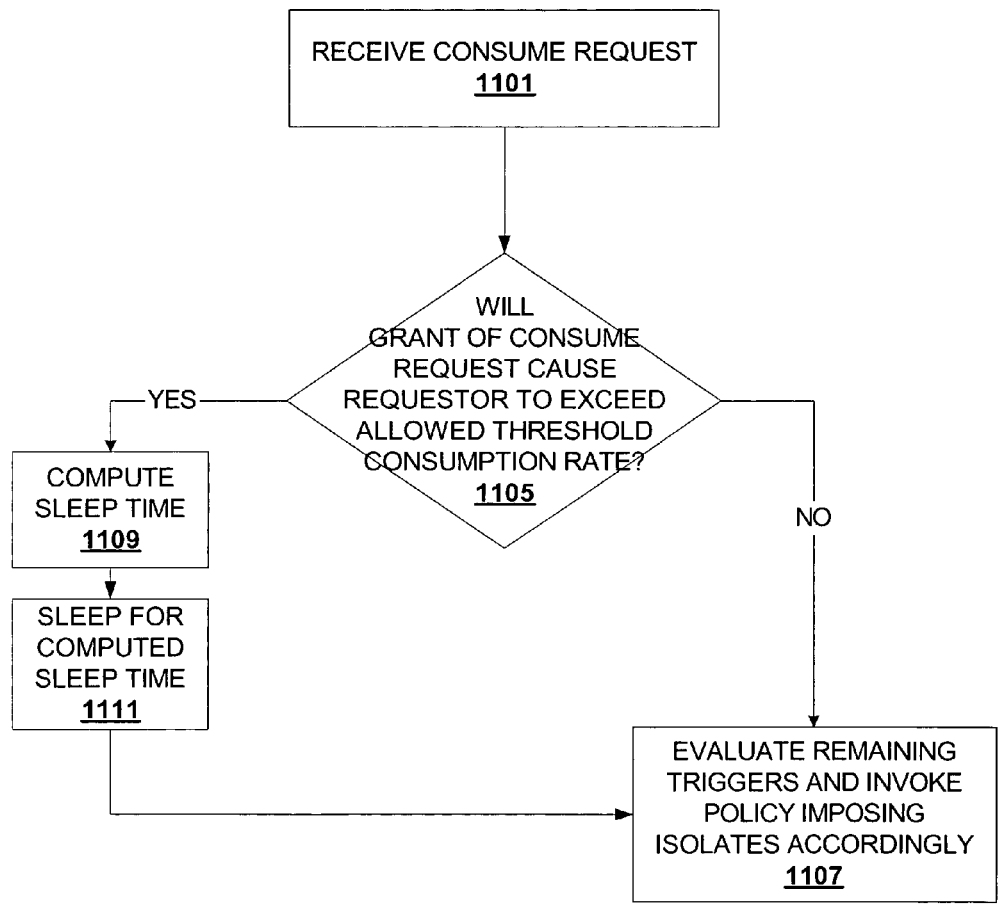
FIG. 11 depicts a flowchart for controlling consumption rate according to some realizations of the invention.

FIG. 11 depicts a flowchart for controlling consumption rate according to some realizations of the invention. At block 1101, a consume request is received from a client (e.g., consumer isolate, user thread, application, etc.). At block 1105, it is determined if granting of the received consume request will cause the requester to exceed its allowed threshold consumption rate. If the threshold consumption rate would be exceeded, then control flows to block 1109. If the threshold consumption rate will not be exceeded, then control flows to block 1107.

At block 1107, the remaining triggers are evaluated and their actions invoked accordingly.

At block 1109, a sleep time is computed. At block 1111, the dispenser sleeps for the computed sleep time. Control flows from block 1111 to block 1107.

For example, assume control over rate of bandwidth consumption is desired. Rate of bandwidth consumption per client is allowed up to 3 Mb/s. A client first requests transmission of 2 Mb. Next, the client requests transmission of another 2 Mb. If the client submits both of these requests within a second, then the first request will be granted (assuming there are no contrary resource management policies or shortage of bandwidth). When the second request is received, then the dispenser goes to sleep with the request until a sufficient amount of time has passed so that granting of the request will be within the threshold rate. If the client requests 5 Mb of bandwidth, then the dispenser may grant the request and sleep with the next request, deny the request, or initially sleep with the request until a sufficient amount of time has passed.

Figure 12:
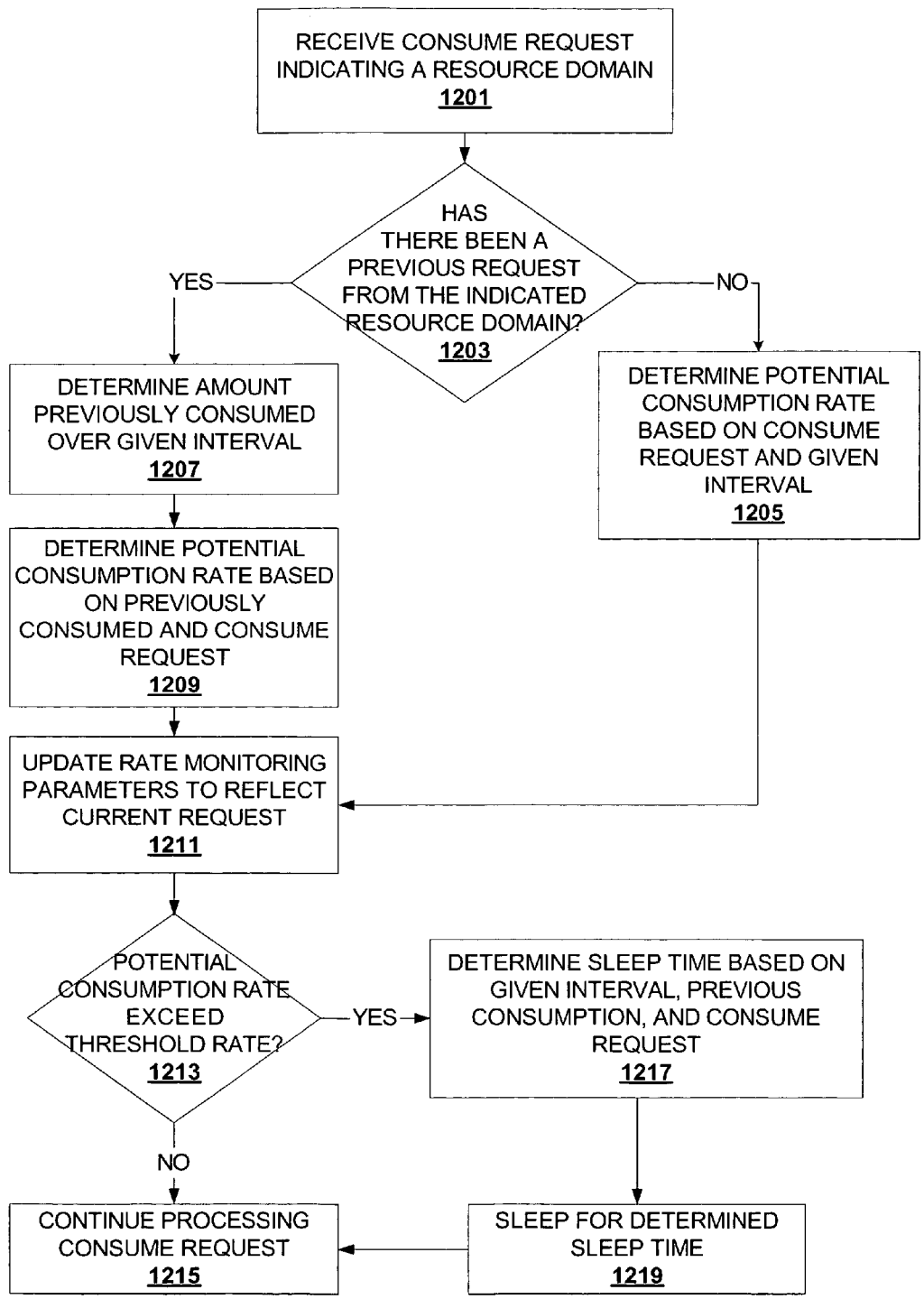
FIG. 12 depicts a flowchart for throttling consumption rate based on a dispenser and resource domains according to some realizations of the invention.

FIG. 12 depicts a flowchart for throttling consumption rate based on a dispenser and resource domains according to some realizations of the invention. At block 1201, a consume request is received that indicates a resource domain. At block 1203, it is determined if there has been a previous resource request, which indicated the same resource domain. If there has been a previous resource request that indicated the same resource domain, then control flows to block 1207. If there has not been a previous resource request that indicates the same resource domain as the current resource request, then control flows to block 1205.

At block 1205, a potential consumption rate is determined based on the current consume request and a given interval. Control flows from block 1205 to block 1211.

At block 1207, the amount previously consumed over the given interval is determined. At block 1209, a potential consumption rate is determined based on the determined previously consumed amount and the current consume request. At block 1211, rate monitoring parameters are updated to reflect the current request. For example, historical requests are updated to include the current request (i.e., currently requested amount) and historical data that falls outside of the given interval is removed. Various realizations of the invention will implement tracking of resource consumption rate differently (e.g., taking unconsume requests into consideration, maintaining a data structure separate from a managing dispenser to persist even if the dispenser is destructed, maintaining a data structure that tracks resource requests with the dispenser, tracking consume requests with a persistent action, tracking requests in the resource domain, etc.). At block 1213, it is determined if the determined potential consumption rate exceeds a threshold or desired rate of consumption. If the determined potential consumption rate exceeds the threshold rate, then control flows to block 1217. If the determined potential consumption rate does not exceed the threshold rate, then control flows to block 1215.

At block 1215, processing of the consume request continues.

At block 1217, a sleep time is determined based on the given interval, the previous consumption, and the consume request. At block 1219, the controlling computation (e.g., a dispenser instance) sleeps for the determined sleep time. Control flows from block 1219 to block 1215.

The following code is an exemplary implementation of controlling consumption rate, similar to that illustrated in FIG. 12, utilizing previously described example class definitions.

```
// The time and current usage of the previous request.
long previousTime=-1, previousUsage=-1;
boolean shouldFire(long currentUsage, long proposedUsage) {
    if (previousTime !=-1)
        record(previousTime, currentUsage-previousUsage);
        previousUsage=currentUsage;
        previousTime=currentTime;
        removeRecordsWithTstampsBefore(currentTime-interval);
        long amount=totalAmountRequestedInRecordedEvents( );
        long delta=proposedUsage-currentUsage;
        if (amount+delta>threshold) {
            long interval1=(interval*(amount+delta))/threshold;
            Thread.sleep(interval1-interval);
        }
        return false; // no need to invoke callback
}
```

As in the above examples, triggers are invoked as the first step of processing a consume request. The shouldFire( ) routine above can know how much of the current request has been granted subsequent to the first time it is invoked. The first lines of shouldFire( ) are responsible for this: if this is not the first time the routine is invoked, the time of the previous request was recorded along with the quantity granted, which is the difference between the usage then and now. Afterwards, records older than interval are removed, and the total amount of requested quantities is computed over the remaining records. If the amount increased by the quantity currently being requested exceeds the threshold, the trigger sleeps long enough to bring the rate of consumption down to the required range. Since triggers in various realizations of the invention operate within a critical section within the dispenser path, other potential consumers are held off during such a sleep. An alternative to controlling consumption rate is to control the rate of consume requests themselves.

Throttling resource requests with an intermediate request handler provides a mechanism for developers to adjust consumption rate (or request rate) independent of the platform, native code, or middleware code. Providing such a mechanism that can be implemented in a safe language facilitates development of diverse techniques for controlling resource consumption rates. In addition, these techniques can take advantage of the flexibility and portability of safe language instead of being hampered by constraints of proprietary code.

While the flow diagrams show a particular order of operations performed by certain realizations of the invention, it should be understood that such order is exemplary (e.g., alternative realizations may perform the operations in a different order, combine certain operations, overlap certain operations, perform certain operations in parallel, etc.). For example, in FIGS. 5 and 9, as each policy decision action is determined it can be set aside and the next policy action determined, the respective operations of the determined policy action be performed before the next policy decision action is determined, a thread can be spawned to perform respective operations as each policy decision action is determined, etc. Also in FIGS. 5 and 9, triggers may be evaluated in parallel or sequentially. As each trigger is evaluated, its one or more corresponding policy decision actions may be executed upon evaluation, its one or more corresponding policy decision actions may be executed after all other triggers are evaluated, etc. In addition, after evaluation of triggers, their corresponding policy decision actions may be executed in parallel or sequentially. Blocks that indicate operations related to merging decisions and reservations may not be performed; FIG. 8 may not take into account global and local dispensers; block 1211 of FIG. 12 may be performed in parallel or combined with block 1209; etc.

Exemplary System

The described invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

Figure 13:
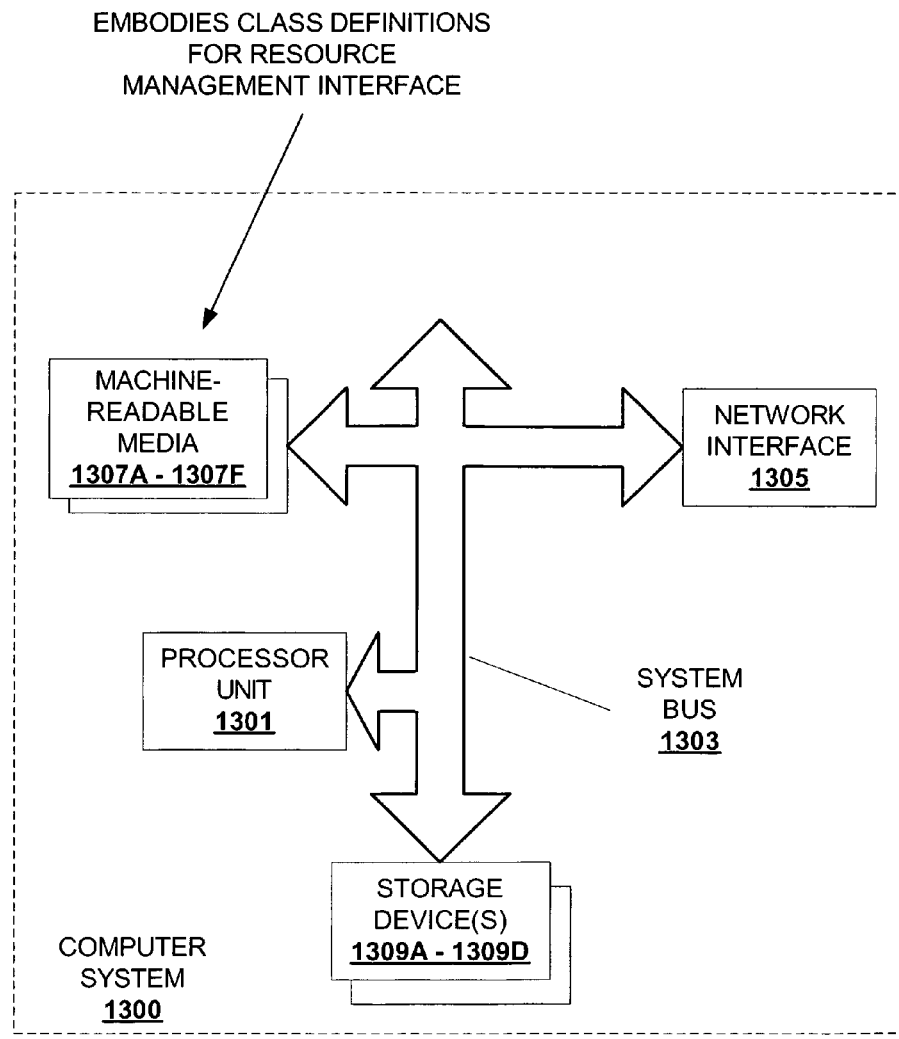
FIG. 13 depicts an exemplary computer system according to some realizations of the invention.

FIG. 13 depicts an exemplary computer system according to some realizations of the invention. A computer system 1300 includes a processor unit 1301 (possibly including multiple processors and/or implementing multi-threading). The computer system 1300 includes a machine-readable media 1307A-1307F. The machine-readable media may be system memory (e.g., one or more of cache, SRAM DRAM, RDRAM, EDO RAM, DDR RAM, EEPROM, etc.) or any one or more of the above already described possible realizations of machine-readable media. The computer system 1300 includes also a system bus 1303 (e.g., LDT, PCI, ISA, etc.), a network interface 1305 (e.g., an ATM interface, an Ethernet interface, a Frame Relay interface, etc.), and a storage device(s) 1309A-1309D (e.g., optical storage, magnetic storage, etc.). One or more of the machine-readable media 1307A-1307F embodies class definitions for a resource management interface that defines a dispenser, resource domain, triggers, callbacks, etc. Realizations of the invention may include fewer or additional components not illustrated in FIG. 13 (e.g., video cards, audio cards, additional network interfaces, peripheral devices, etc.). The processor unit 1301, the storage device(s) 1309A-1309D, and the network interface 1305 are coupled to the system bus 1303. The machine-readable media 1307A-1307F is either coupled directly or indirectly to the system bus 1303.

While circuits and physical structures are generally presumed, it is well recognized that in modern semiconductor and design fabrication, physical structures and circuits may be embodied in computer readable descriptive form suitable for use in subsequent design, test, or fabrication stages as well as in resultant fabricated semiconductor integrated circuits.

Accordingly, claims directed to traditional circuits or structure may, consistent with particular language thereof, read upon computer readable encodings and representations of same, whether embodied in media or combined with suitable reader facilities to allow fabrication, test, or design refinement of the corresponding circuits and/or structures.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A system, comprising:
a processor; and
a memory storing program instructions executable by the processor, wherein the program instructions comprise computations that implement a plurality of dispensers, wherein each dispenser is configured to:
monitor resource requests for a single, respective one of a plurality of consumable execution resources, wherein consumable execution resources are measurable entities that computations can consume; and
determine responses to the resource requests for the single, respective resource, wherein determining a response to a resource request comprises determining whether to grant the resource request or determining an amount of the single, respective resource to grant;
wherein the program instructions comprising computations that implement each of the dispensers are distinct from program instructions comprising computations that implement the single, respective resource for which the dispenser monitors and determines responses to resource requests;
wherein the program instructions comprising computations that implement each of the dispensers are distinct from program instructions comprising computations that consume the single, respective resource for which the dispenser monitors and determines responses to resource requests;
wherein each of the dispensers is further configured to invoke one or more computations that impose one or more resource management policies in determining responses to resource requests for the single, respective resource for which the dispenser monitors and determines responses to resource requests; and
wherein each of the dispensers is further configured to receive one or more policy decisions with regard to the resource requests for the single, respective resource for which the dispenser monitors and determines responses to resource requests from the computations that impose the one or more resource management policies.

2. The system of claim 1, wherein each of the dispensers monitors and determines responses to requests based at least in part on a set of common attributes that characterize the single, respective resource for which the dispenser monitors and determines responses to resource requests with respect to consuming or releasing the single, respective resource.

3. The system of claim 2, wherein the set of common attributes is usable to characterize resources with respect to consuming or releasing the resources for a broad array of resource types.

4. The system of claim 2, wherein the common attributes include one or more of: disposable, revocable, reservable, or bounded.

5. The system of claim 1, wherein each of the dispensers is an instance of a dispenser class defined by program instructions that are distinct from the program instructions comprising computations that implement the single, respective resource for which the dispenser monitors and determines responses to resource requests.

6. The system of claim 5, wherein each of the respective resources is implemented by one or more computations that include one or more of an operating environment, libraries, programming language runtime systems, middleware, or applications classes.

7. The system of claim 1, wherein a computation comprises a process, a thread, an operating environment, or an application.

8. The system of claim 1, wherein each of the dispensers is further configured to provide responses to requesters of the single, respective resource for which the dispenser monitors and determines responses to resource requests based at least in part on the one or more policy decisions received from the computations that impose the one or more resource management policies.

9. The system of claim 8, wherein each of the responses provided is also based at least in part on a merging of two or more policy decisions received from the computations that impose the one or more resource management policies.

10. The system of claim 9, wherein the merging of policy decisions is performed using a programmed method for merging the two or more policy decisions.

11. The system of claim 10, wherein each of the dispensers is further configured to invoke a set of one or more operations that implement the programmable method for merging the two or more policy decisions and that return a merged policy decision.

12. The system of claim 9, wherein the method for merging the two or more policy decisions comprises one or more of: determining a smallest amount of the single, respective resource granted for one of the resource requests by corresponding policy decisions, determining a greatest amount of the single, respective resource granted by corresponding policy decisions, determining an average amount of the single, respective resource granted by the corresponding policy decisions, or selecting one of the policy decisions in accordance with applicable criteria.

13. The system of claim 1, wherein each of the dispensers is further configured to:
determine if one or more triggers are applicable to one of the resource requests for the single, respective resource for which the dispenser monitors and determines responses to resource requests;
resolve any triggers determined to be applicable to the one of the resource requests, wherein one or more policy decision actions are dependent on resolution of the triggers determined to be applicable to the one of the resource requests;

execute one or more of the one or more policy decision actions in accordance with the resolved triggers.

14. The system of claim 13, wherein each of the one or more triggers includes one or more operations to determine existence of a condition for executing a corresponding policy decision action that is dependent on resolution of the trigger.

15. The system of claim 13, wherein executing policy decision actions comprises invoking resource management policy computations that provide policy decisions.

16. The of claim 13, wherein the policy decision actions include pre-decision policy actions and post-decision policy actions.

17. The system of claim 1, wherein the resource comprises a consumable physical resource or a consumable logical resource.

18. The system of claim 17, wherein physical resources include processing time, memory, bus access time, and network bandwidth.

19. The system of claim 17, wherein logical resources include sockets, data structures, and application specific resources.

20. A method, comprising:
processing, by a dispenser, a plurality of requests to consume a given resource or to release a given resource that was being consumed based at least in part on a value of one or more common resource attributes as applied to the given resource, wherein said processing comprises monitoring the plurality of requests, wherein the given resource is a measurable entity that a computation can consume, wherein the common resource attributes are usable to characterize resources with respect to consuming or releasing the resources, wherein the common resource attributes are applicable to resources of the type of the given resource and to resources of types other than the type of the given resource, wherein values of the one or more common resource attributes as applied to the given resource are not unique values specific to the implementation of the given resource, and wherein the one or more common resource attributes comprise one or more of: disposable, revocable, reservable, or bounded;
determining, by the dispenser, responses for the plurality of requests, wherein determining a response to a request to consume the given resource comprises determining whether to grant the request to consume the given resource or determining an amount of the given resource to grant, and wherein said determining is based at least in part on the values of the one or more common resource attributes as applied to the given resource; and
providing the responses to a set of one or more resource consuming computations from which the requests were received;
wherein the dispenser is one of a plurality of dispensers, each of which processes and determines responses to resource requests for a single, respective one of a plurality of consumable resources;
wherein implementation of the dispenser is distinct from implementation of the one or more resource consuming computations; and
wherein implementation of the dispenser is distinct from implementation of the given resource.

21. The method of claim 20, further comprising characterizing the given resource with the one or more common resource attributes.

22. The method of claim 20, wherein said processing comprises executing one or more policy decision actions that cause imposition of one or more resource management policies.

23. The method of claim 22, wherein the policy decision actions are executed in response to determining that one or more triggers applicable to the requests resolve to true.

24. The method of claim 22, wherein the policy decision actions include pre-decision actions and post-decision actions.

25. The method of claim 24, wherein the pre-decision policy actions include actions that invoke computations that impose resource management usage limit policies and wherein the post-decision policy actions include actions that invoke computations that impose resource management notification policies.

26. The method of claim 22, wherein the provided responses are based at least in part on policy decisions that are dependent on the imposed resource management policies.

27. The method of claim 26, wherein at least one of the provided responses is dependent on a plurality of the policy decisions, and wherein the at least one response grants a merged amount of the given resource, wherein the merged amount of the given resource is an amount of the given resource that is dependent on the plurality of policy decisions.

28. The method of claim 27, wherein the merged amount of the given resource comprises a smallest amount granted by the plurality of decisions, a greatest amount granted by the plurality of decisions, an average amount granted by the plurality of decisions, or an amount that satisfies programmable criteria applied to the plurality of decisions.

29. The method of claim 22, further comprising:
evaluating one or more triggers that are applicable to the requests; and
generating a set of one or more policy decision actions that correspond to those triggers of the one or more triggers that evaluate to true, wherein the set of policy decision actions include at least some of the executed policy decision actions.

30. The method of claim 22, wherein the resource management policies are defined independently of the implementation of the given resource, wherein each of the resource management policies is imposed by one or more computations, and wherein each of the computations is encapsulated and does not share computational state with other computations.

31. The method of claim 30, wherein the computations do not share objects with other computations.

32. The method of claim 20, wherein the given resource is implemented by one or more of a library, middleware, a programming language runtime system, an operating environment, or an application class.

33. The method of claim 20, embodied as a computer program product encoded in one or more non-transitory machine-readable storage media.

34. The method of claim 20, further comprising validating the requests for the given resource against reservations for the given resource.

35. A method, comprising:
monitoring, by a dispenser, one or more requests to consume a given resource or to release a given resource that was being consumed from one or more resource consuming isolates, wherein the given resource is a measurable entity that a resource consuming isolate can consume; and
governing, by the dispenser, a request to consume the given resource or to release the given resource, wherein the resource request is governed based at least in part on a value of one or more common resource attributes as applied to the given resource, wherein the common resource attributes are usable to characterize resources with respect to consuming or releasing the resources, wherein the common resource attributes are applicable to resources of the type of the given resource and to resources of types other than the type of the given resource, wherein values of the one or more common resource attributes as applied to the given resource are not unique values specific to the implementation of the given resource, and wherein governing a request to consume a given resource comprises determining whether to grant the request to consume the given resource or determining an amount of the given resource to grant; and providing a response to the request to consume or release the given resource to the resource consuming isolate;

wherein said governing comprises:
   invoking one or more computations that impose one or more resource management policies in determining responses to requests to consume the given resource or to release the given resource; and
   receiving one or more policy decisions with regard to the request to consume the given resource or to release the given resource from the computations that impose the one or more resource management policies;

wherein the dispenser is one of a plurality of dispensers, each of which monitors and governs requests to consume or release a single, respective one of a plurality of consumable resources;

wherein implementation of the dispenser is distinct from implementation of the resource consuming isolate; and wherein implementation of the dispenser is distinct from implementation of the given resource.

36. The method of claim 35, wherein the response is based at least in part on the one or more policy decisions, and wherein the one or more policy decisions are based on the one or more resource management policies.

37. The method of claim 36, wherein the one or more computations that impose the one or more resource management policies are policy imposing isolates.

38. The method of claim 35, wherein the response indicates a merged amount of the given resource, wherein the merged amount of the given resource is an amount of the given resource that is dependent on two or more of the one or more policy decisions.

39. The method of claim 38, wherein the merged amount of the given resource is generated by a set of one or more operations that programmatically merge the two or more of the one or more policy decisions.

40. The method of claim 38, wherein the merged amount of the given resource includes a smallest resource amount granted by the two or more of the one or more policy decisions, a largest amount granted by the two or more of the one or more policy decisions, or an average amount granted by the two or more of the one or more policy decisions.

41. The method of claim 35, wherein the resource consuming isolate includes a set of one or more computations, and wherein the resource consuming isolate does not share computational state with other isolates and does not share objects with other isolates.

42. The method of claim 35, further comprising characterizing the given resource with the one or more common resource attributes.

43. The method of claim 35, wherein the one or more common resource attributes include one or more of: disposable, revocable, reservable, or bounded.

44. The method of claim 35,
wherein said invoking comprises:
   determining one or more policy decision actions that are applicable to the request;
   executing the one or more determined policy decision actions;
wherein said receiving comprises receiving the one or more policy decisions from execution of the one or more policy decision actions; and
wherein said governing further comprises:
   determining the response based at least in part on the received one or more policy decisions.

45. The method of claim 44, further comprising determining that there are one or more reservations for the given resource, wherein said determining the response is further based on the determined reservations.

46. The method of claim 44, wherein at least one of the policy decision actions is associated with a trigger, and wherein the at least one of the policy decision actions is executed in response to the trigger resolving to true and is not executed if the trigger does not resolve to true.

47. The method of claim 46, wherein the trigger functions as a gate to the at least one of the policy decision actions associated with the trigger.

48. The method of claim 35, wherein the resource consuming isolate comprises a process, a thread, an operating environment, or an application.

49. The method of claim 35, embodied as a computer program product encoded in one or more non-transitory machine-readable storage media.

50. A computer program product, encoded on one or more non-transitory machine-readable storage media, the computer program product comprising program instructions executable by one or more computers to implement:
   a dispenser class that defines an interface to expose a single, respective one of a plurality of consumable execution resources to computations that consume resources and to monitor and determine responses to requests for the single, respective resource, wherein consumable execution resources are measurable entities that computations can consume, wherein the dispenser class is instantiable to create a plurality of instances of the dispenser class, each of which is configured to monitor and determine responses to requests for a single, respective one of the plurality of consumable execution resources, and wherein determining a response to a resource request comprises determining whether to grant the resource request or determining an amount of the single, respective resource to grant; and
   a resource request action class that defines an action to invoke an instance of the dispenser class;
wherein each of the plurality of resources is implemented by one or more computations that include one or more of: an operating environment, libraries, programming language runtime systems, middleware, or applications classes;
wherein the program instructions that are executable to implement the dispenser class are distinct from program instructions comprising the one or more computations that implement each of the plurality of resources; and
wherein the program instructions that are executable to implement the dispenser class are distinct from program instructions comprising the computations that consume the plurality of resources.

51. The computer program product of claim 50, wherein the program instructions are further executable by the one or more computers to implement:

a resource attribute class that defines common resource attributes usable for characterizing resources of a broad range of resource types to be managed by instances of the dispenser class, wherein the common resource attributes characterize the resources with respect to consuming or releasing the resources, and wherein values of the common resource attributes as applied to any given resource are not unique values specific to the implementation of the given resource.

52. The computer program product of claim 51, wherein the common resource attributes comprise one or more of: disposable, revocable, reservable, or bounded.

53. The computer program product of claim 52, wherein the common attributes further comprise a granularity attribute that indicates an indivisible unit of a resource that is manageable by instances of the dispenser class.

54. The computer program product of claim 52, wherein the common attributes further comprise a measurement delay attribute that indicates a maximum delay time between consuming a given resource and updating usage information of the given resource.

55. The computer program product of claim 52, wherein the common resource attributes further comprise an explicit attribute that indicates whether it is possible to identify a point at which the resource is consumed.

56. The computer program product of claim 50, wherein the program instructions are further executable by the one or more computers to implement a trigger class that defines a method for imposing a condition on invocation of one or more computations that impose a resource management policy for managing resource requests.

57. The computer program product of claim 56, wherein an instance of the trigger class utilizes current usage of a resource and requested usage of the resource to determine whether one or more associated policy decision actions should be executed.

58. The computer program product of claim 50, wherein an instance of the dispenser class provides a response to a resource consumer based at least in part on one or more resource management policy decisions.

59. The computer program product of claim 50, wherein an instance of the dispenser class provides a response to a resource consumer based at least in part on absence of a resource management policy decision.

60. The computer program product of claim 50, wherein the dispenser class is instantiable as a global dispenser or a local dispenser, wherein global dispenser instances of the dispenser class are used to monitor and determine responses to requests for resources with a single source of production and local dispenser instances of the dispenser class are used to monitor and determine responses to requests for resources that may be independently produced by multiple sources.

61. The computer program product of claim 50, wherein the program instructions are further executable by the one or more computers to implement a routine to determine a total amount of a single, respective resource to be managed by a single dispenser instance.

62. The computer program product of claim 50, wherein the program instructions are further executable by the one or more computers to implement a resource domain class that defines an entity that represents an association of a resource management policy with a given resource.

63. The computer program product of claim 50, wherein the program instructions are implemented in a safe language that is platform independent and application independent.

64. The computer program product of claim 63, wherein the safe language includes one or more of: Java® programming language, TeleScript, or Tcl.

65. A computer program product, encoded on one or more non-transitory machine-readable storage media, the computer program product comprising program instructions executable by one or more computers to implement:
   a common resource attribute class that defines common resource attributes for characterizing resources with respect to consuming or releasing the resources, wherein the common resource attributes are applicable to resources of different types, wherein values of the one or more common resource attributes as applied to any given resource are not unique values specific to the implementation of the given resource, and wherein the one or more common resource attributes comprise one or more of: disposable, revocable, reservable, or bounded; and
   a dispenser class that defines a posting facility to monitor and process posted resource requests for a single, respective resource of a plurality of consumable execution resources based at least in part on abstractions of resources utilizing the common resource attribute class, wherein consumable execution resources are measurable entities that computations can consume, wherein the dispenser class is instantiable to create a plurality of instances of the dispenser class, each of which is configured to monitor and process requests for a single, respective one of the plurality of consumable execution resources, and wherein processing a posted resource request comprises determining whether to grant the posted resource request or determining an amount of the single, respective resource to grant;
   wherein the program instructions that are executable to implement the dispenser class are distinct from program instructions comprising computations that implement each of the plurality of resources; and
   wherein the program instructions that are executable to implement the dispenser class are distinct from program instructions comprising computations that consume the plurality of resources.

66. The computer program product of claim 65, wherein the common attributes further comprise a granularity attribute that indicates an indivisible unit of a resource that is manageable by instances of the dispenser class.

67. The computer program product of claim 65, wherein the common attributes further comprise a measurement delay attribute that indicates a maximum delay time between consuming a given resource and updating usage information of the given resource.

68. The computer program product of claim 65, wherein the common resource attributes further comprise an explicit attribute that indicates whether it is possible to identify a point at which the resource is consumed.

69. The computer program product of claim 65, wherein the program instructions are further executable by the one or more computers to implement a trigger class to gate imposition of one or more resource management policies.

70. The computer program product of claim 69, wherein the one or more resource management policies include one or more of: usage limit policies, reservation policies, or notification policies.

71. The computer program product of claim 69, wherein an instance of the trigger class utilizes current usage of a resource and requested usage to determine whether corresponding policy decision actions should be executed.

72. A computer program product, encoded on one or more non-transitory machine-readable storage media, the computer program product comprising program instructions executable by one or more computers to implement:
- characterizing a given resource with respect to consuming or releasing the given resource using one or more common resource attributes to separate the given resource from its implementation, wherein the given resource is a measurable entity that a resource consuming computation can consume, wherein the common resource attributes are applicable to characterize resources of different types, and wherein values of the one or more common resource attributes as applied to the given resource are not unique values specific to the implementation of the given resource;
- managing requests for the given resource, wherein the program instructions executable by the one or more computers to implement managing requests for the given resource are distinct from program instructions comprising computations that implement the given resource, wherein the program instructions executable by the one or more computers to implement managing requests for the given resource are distinct from program instructions comprising resource consuming computations, wherein managing requests for the given resource comprises monitoring requests for the given resource and determining responses to the requests for the given resource, and wherein determining a response to a request for the given resource comprises determining whether to grant the request or determining an amount of the given resource to grant; and
- hiding the computations that implement the given resource from the resource consuming computations;
- wherein the program instructions executable by the one or more computers to implement managing requests for the given resource are configured to manage resource requests for a single, respective one of a plurality of consumable resources and are separate from program instructions executable by the one or more computers to implement managing requests for other ones of the plurality of consumable resources;
- wherein said determining responses to resource requests for the given resource comprises:
  - invoking one or more computations that impose one or more resource management policies in determining responses to resource requests for the given resource; and
  - receiving one or more policy decisions with regard to the resource requests for the given resource from the computations that impose the one or more resource management policies.

73. The computer program product of claim 72, wherein the computations that implement the resource comprise an operating system, middleware, a library, a virtual machine, a programming language runtime system, or an application class.

74. The computer program product of claim 72, wherein the resource consuming computations are implemented as isolates, wherein an isolate is a set of one or more computations that does not share computational state with other isolates and does not share objects with other isolates.

75. An apparatus, comprising:
- system memory;
- means for separating implementation of a given resource from implementation of mechanisms for monitoring and determining responses to requests to consume or release the given resource that are posted by first computations, wherein the first computations are encapsulated to prevent sharing of computational state with other computations;
- means for separating implementation of the mechanisms for monitoring and determining responses from implementation of the first computations; and
- means for characterizing the given resource with respect to consuming or releasing the given resource using one or more common resource attributes, wherein the given resource is a measurable entity that a resource consuming computation can consume, wherein the common resource attributes are applicable to characterize resources of different types, wherein values of the one or more common resource attributes as applied to the given resource are not unique values specific to the implementation of the given resource, wherein the one or more common resource attributes comprise one or more of: disposable, revocable, reservable, or bounded, wherein the monitoring and determining responses to consume or release requests for the given resource is based at least in part on the values of the one or more common resource attributes as applied to the given resource, and wherein determining a response to a consume request comprises determining whether to grant the consume request or determining an amount of the given resource to grant;
- wherein the mechanisms for monitoring and determining responses are configured to monitor and determine responses to resource requests for a single, respective one of a plurality of consumable resources and are separate from mechanisms for monitoring and determining responses to requests to consume or release other ones of the plurality of consumable resources.

76. The apparatus of claim 75, further comprising a non-transitory machine-readable storage media that embodies said means.

* * * * *